United States Patent
Chatterjee et al.

(10) Patent No.: US 10,306,452 B2
(45) Date of Patent: May 28, 2019

(54) RESOURCE ALLOCATION TECHNIQUES FOR DEVICE-TO-DEVICE (D2D) DISCOVERY

(71) Applicant: INTEL IP CORPORATION, Santa Clara, CA (US)

(72) Inventors: Debdeep Chatterjee, Mountain View, CA (US); Seunghee Han, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 138 days.

(21) Appl. No.: 15/502,180

(22) PCT Filed: Jun. 26, 2015

(86) PCT No.: PCT/US2015/038075
§ 371 (c)(1),
(2) Date: Feb. 6, 2017

(87) PCT Pub. No.: WO2016/022227
PCT Pub. Date: Feb. 11, 2016

(65) Prior Publication Data
US 2017/0230816 A1     Aug. 10, 2017

Related U.S. Application Data

(60) Provisional application No. 62/034,634, filed on Aug. 7, 2014.

(51) Int. Cl.
| | |
|---|---|
| *H04W 88/02* | (2009.01) |
| *H04W 92/10* | (2009.01) |
| *H04W 8/00* | (2009.01) |
| *H04W 72/04* | (2009.01) |

(52) U.S. Cl.
CPC ......... *H04W 8/005* (2013.01); *H04W 72/042* (2013.01); *H04W 88/02* (2013.01); *H04W 92/10* (2013.01)

(58) Field of Classification Search
CPC ..... H04W 8/00; H04W 8/005; H04W 72/042; H04W 72/04; H04W 88/02; H04W 92/10
See application file for complete search history.

(56) References Cited

U.S. PATENT DOCUMENTS

| | | | |
|---|---|---|---|
| 8,588,690 B2 | 11/2013 | Turtinen et al. | |
| 9,398,438 B2 * | 7/2016 | Sartori | ................. H04W 8/005 |

(Continued)

FOREIGN PATENT DOCUMENTS

| | | |
|---|---|---|
| RU | 2503153 C2 | 12/2013 |
| WO | 2013121399 A1 | 8/2013 |
| WO | 2014111154 A1 | 7/2014 |

OTHER PUBLICATIONS

Supplementary European Search Report received for European Patent Application No. 15829312.6, dated Jan. 18, 2018, 5 pages.

(Continued)

*Primary Examiner* — Charles C Jiang
*Assistant Examiner* — Kyaw Z Soe

(57) ABSTRACT

Resource allocation techniques for device-to-device (D2D) discovery are described. In one embodiment, for example, user equipment (UE) may comprise at least one radio frequency (RF) transceiver to receive device-to-device (D2D) configuration information comprising a D2D discovery period index value for a first D2D discovery period and logic, at least a portion of which is in hardware, the logic to determine a D2D discovery period index value for a second D2D discovery period based on the D2D discovery period index value for the first D2D discovery period and determine a set of D2D discovery resource allocation parameters for the second D2D discovery period based on a set of D2D discovery resource allocation parameters for the first D2D discovery period and the D2D discovery period index value for the second D2D discovery period. Other embodiments are described and claimed.

26 Claims, 9 Drawing Sheets

(56) References Cited

U.S. PATENT DOCUMENTS

| | | | |
|---|---|---|---|
| 2013/0109301 A1 | 5/2013 | Hakola et al. | |
| 2013/0195026 A1 | 8/2013 | Johnsson et al. | |
| 2013/0286963 A1 | 10/2013 | Zheng et al. | |
| 2014/0010172 A1 | 1/2014 | Wei et al. | |
| 2014/0056220 A1 | 2/2014 | Poitau et al. | |
| 2014/0064263 A1 | 3/2014 | Cheng et al. | |
| 2014/0204898 A1 | 7/2014 | Yang et al. | |
| 2014/0213221 A1 | 7/2014 | Chai et al. | |
| 2015/0245192 A1* | 8/2015 | Wu | H04W 8/005 370/329 |
| 2016/0095099 A1* | 3/2016 | Yang | H04L 5/00 370/330 |
| 2017/0118621 A1* | 4/2017 | Sorrentino | H04W 76/14 |
| 2017/0215199 A1 | 7/2017 | Wu et al. | |

OTHER PUBLICATIONS

"On Resource Allocation for D2D Discovery", Intel Corporation, 3GPP Draft; R1-140133, Feb. 9, 2014, 6 pages.

"Resource allocation for type 2B discovery", Samsung, 3GPP TSG RAN WG1, R1-142113, May 19-23, 2014, 6 pages.

"Further discussion on resource allocation for D2D discovery", CATT, 3GPP TSG RAN WG1, R1-140098, Feb. 10-14, 2014, 9 pages.

International Search Report and Written Opinion received for PCT Patent Application No. PCT/US2015/038075, dated Oct. 8, 2015, 9 pages.

"Resource Allocation for Type 2B Discovery", ZTE, R1-142233, 3GPP TSG-RAN WG1 #77, May 10, 2014, 4 pages.

"On mode 1 resource allocation for broadcast communication", CATT, R1-142004, 3GPP TSG-RAN WG1 Meeting #77, 5 pages.

"Mode 1 resource allocation for D2D broadcast communication", Samsung, R1-142112, 3GPP TSG-RAN WG1 Meeting #77, 7 pages.

"On the Use of Type 2B Discovery", ASUSTeK, R1-140292, 3GPP TSG-RAN WG1 Meeting #76, 5 pages.

"On Resource Allocation for D2D Discovery", Intel Corporation, 3GPP TSG RAN WG1Meeting #75 R1-135119, 3GPP, Nov. 11, 2013.

\* cited by examiner

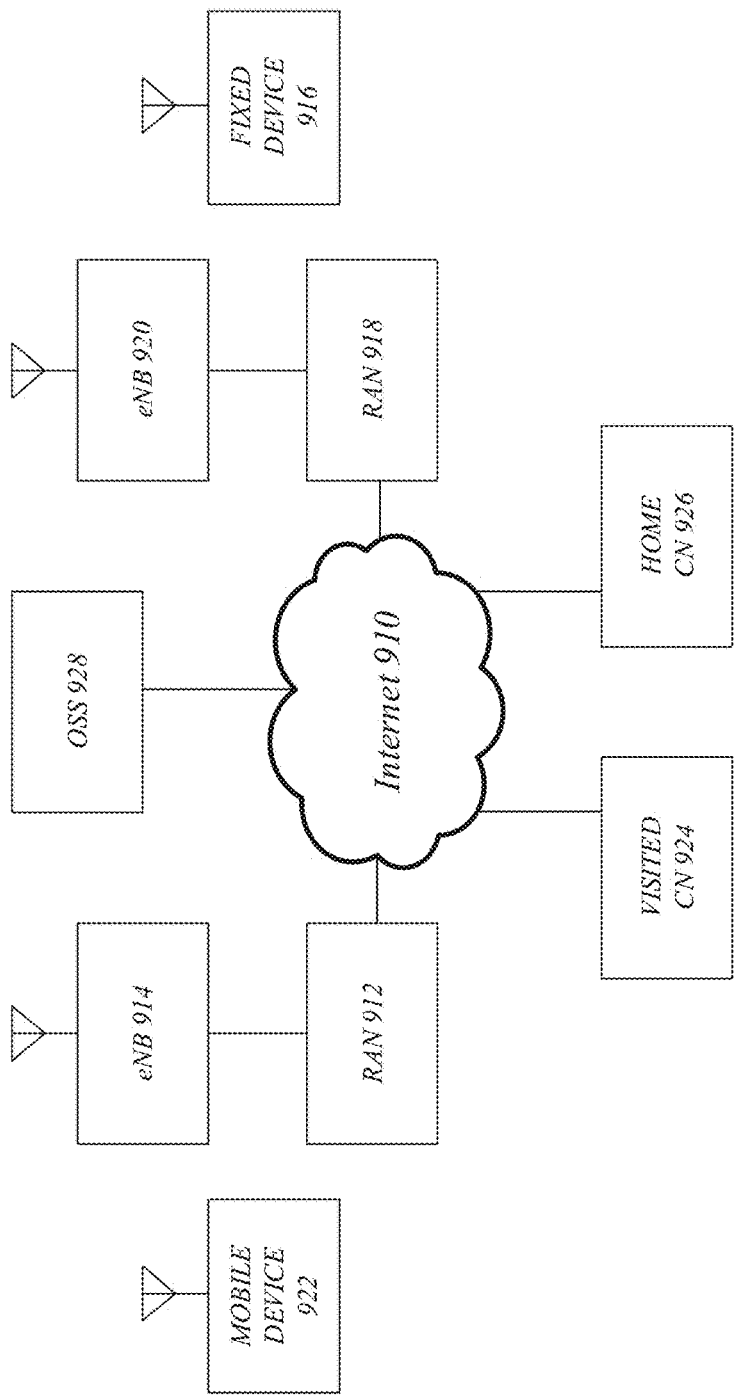

RESOURCE ALLOCATION TECHNIQUES FOR DEVICE-TO-DEVICE (D2D) DISCOVERY

CROSS-REFERENCE TO RELATED APPLICATIONS

This application is a national phase claiming the benefit of and priority to International Patent Application No. PCT/US2015/038075, entitled "RESOURCE ALLOCATION TECHNIQUES FOR DEVICE-TO-DEVICE (D2D) DISCOVERY", filed Jun. 26, 2015, which claims priority to U.S. Provisional Patent Application No. 62/034,634, entitled "RESOURCE ALLOCATION TECHNIQUES FOR DEVICE-TO-DEVICE (D2D) DISCOVERY", filed Aug. 7, 2014, which are hereby incorporated by reference in their entireties.

TECHNICAL FIELD

Embodiments herein generally relate to communications between devices in broadband wireless communications networks.

BACKGROUND

In an Evolved Universal Mobile Telecommunications System Terrestrial Radio Access Network (E-UTRAN), an evolved node B (eNB) may be responsible for allocating wireless channel resources to accommodate device-to-device (D2D) discovery signal transmissions on the part of D2D-capable user equipment (D2D UEs) that wish to perform such transmissions. A given D2D discovery resource allocation may apply to a series of D2D discovery periods. Depending on an applicable discovery mode, an eNB may allocate D2D discovery resources in a UE-specific manner or a non-UE-specific manner. With respect to UE-specific D2D discovery resource allocation, in order to reduce the impact of the half-duplex constraint and/or randomize interference associated with in-band emissions, a resource hopping scheme may be utilized. According to such a resource hopping scheme, the particular subframes and/or subcarriers that are allocated to a UE for D2D discovery transmissions may vary across—and potentially within—D2D discovery periods.

BRIEF DESCRIPTION OF THE DRAWINGS

FIG. 9 illustrates an embodiment of wireless network.

DETAILED DESCRIPTION

Figure 1:
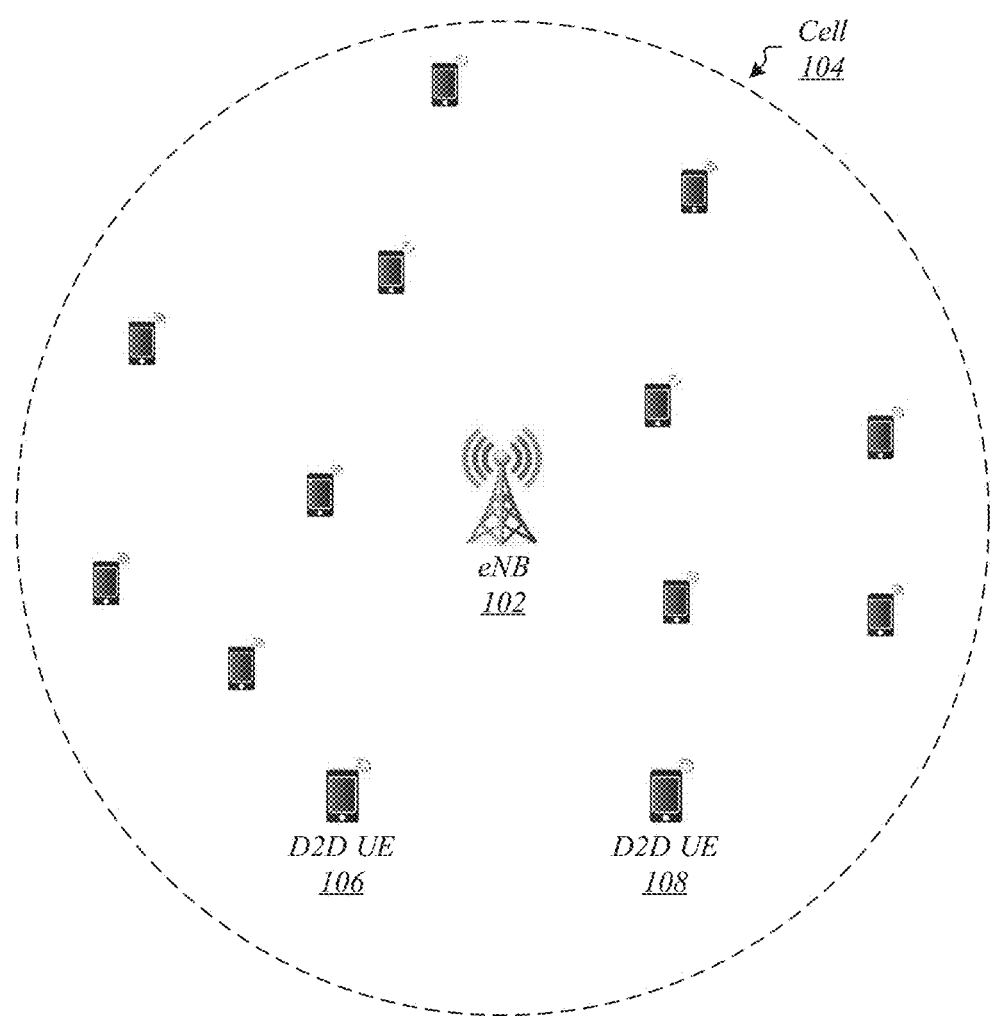
FIG. 1 illustrates an embodiment of a first operating environment.

Various embodiments may be generally directed to resource allocation techniques for device-to-device (D2D) discovery. In one embodiment, for example, user equipment (UE) may comprise at least one radio frequency (RF) transceiver to receive device-to-device (D2D) configuration information comprising a D2D discovery period index value for a first D2D discovery period and logic, at least a portion of which is in hardware, the logic to determine a D2D discovery period index value for a second D2D discovery period based on the D2D discovery period index value for the first D2D discovery period and determine a set of D2D discovery resource allocation parameters for the second D2D discovery period based on a set of D2D discovery resource allocation parameters for the first D2D discovery period and the D2D discovery period index value for the second D2D discovery period. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 in which the disclosed resource allocation techniques for D2D discovery may be implemented in various embodiments. As shown in FIG. 1, an eNB 102 serves a cell 104, and generally provides wireless connectivity to UEs within cell 104. In conjunction with providing such wireless connectivity, eNB 102 may perform operations such as managing radio resource control (RRC) states of UEs within cell 104, allocating wireless channel resources for communications on the part of UEs within cell 104, notifying UEs within cell 104 of such allocated resources, and sending data to and/or receiving data from UEs within cell 104. In this example, the UEs within cell 104 include D2D UEs 106 and 108, and thus eNB 102 may perform such operations in conjunction with providing wireless connectivity to D2D UEs 106 and 108. In various embodiments, the RRC state management, resource allocation, notification, and communication operations that eNB 102 performs may include operations performed in order to enable D2D discovery and data communication between D2D UEs within cell 104, such as between D2D UEs 106 and 108. In some embodiments, for example, eNB 102 may allocate wireless channel resources for use by D2D UE 106 in transmitting D2D discovery signals. In various such embodiments, eNB 102 may perform multi-period D2D discovery resource allocation, according to which it may allocate respective resources of each of a series of D2D discovery periods for use by D2D UE 106 in transmitting D2D discovery signals. The embodiments are not limited in this context.

Figure 2:
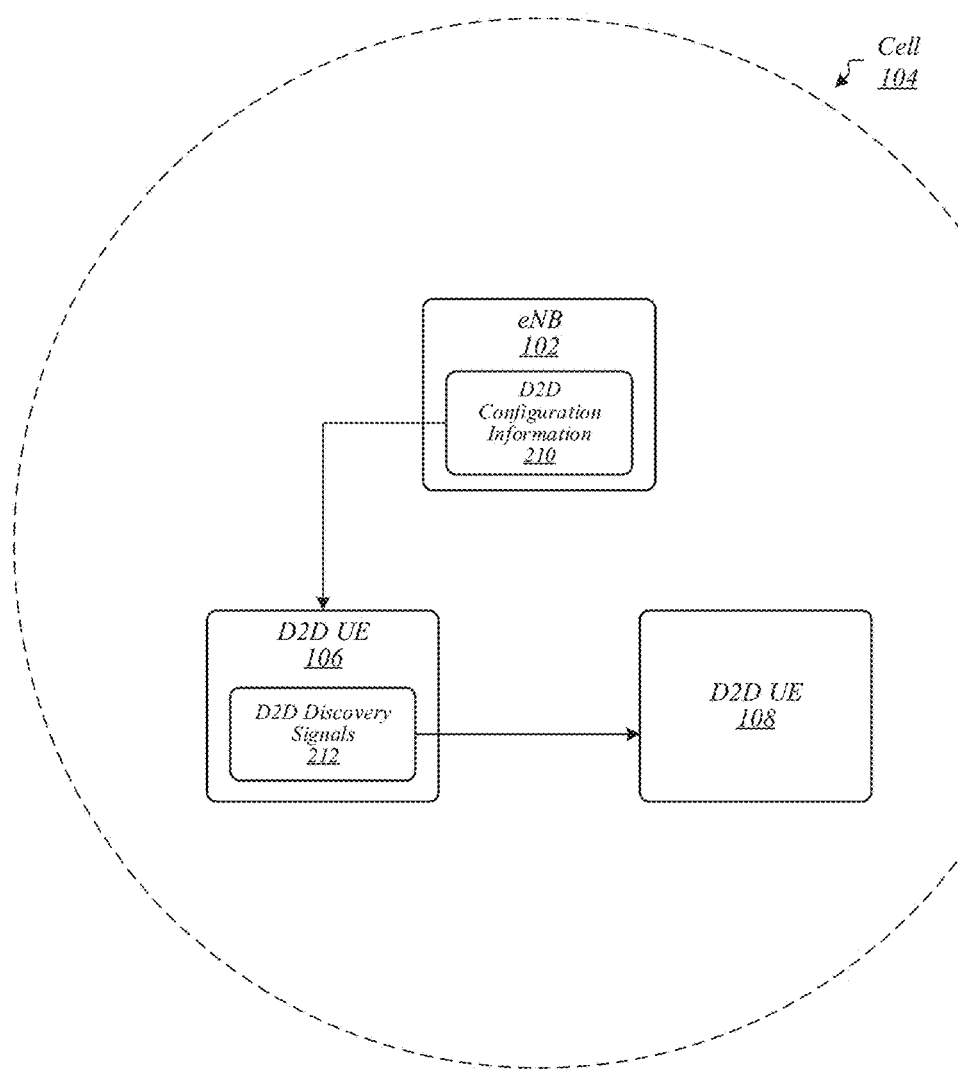
FIG. 2 illustrates an embodiment of a second operating environment.

FIG. 2 illustrates an example of an operating environment 200 in which the disclosed resource allocation techniques for D2D discovery may be implemented in various embodiments. Operating environment 200 may be representative of some embodiments in which eNB 102 of FIG. 1 performs multi-period D2D discovery resource allocation to allocate wireless channel resources for use by D2D UE 106 in transmitting D2D discovery signals during a series of D2D discovery periods. In various embodiments, the allocation performed by eNB 102 in operating environment 200 may comprise a UE-specific allocation, such that the allocated resources are allocated specifically to D2D UE 106. In some embodiments, for example, eNB 102 may allocate wireless channel resources to D2D UE 106 according to a Type 2/2B D2D discovery mode. In such embodiments, the allocated wireless channel resources may include respective resources of each of a series of Type 2/2B discovery periods. In various embodiments, for each of a series of D2D discovery periods, eNB 102 may allocate resources for a respective D2D discovery signal transmission on the part of D2D UE 106 during that D2D discovery period. In some other embodiments, for some or all of the series of D2D discovery periods, eNB 102 may allocate resources for multiple respective D2D discovery signal transmissions on the part of D2D UE 106. The embodiments are not limited in this context.

In various embodiments, eNB 102 may send D2D configuration information 210 to D2D UE 106 in order to inform D2D UE 106 of the wireless channel resources that have been allocated for its use to transmit D2D discovery signals during the series of D2D discovery periods. In some embodiments, D2D configuration information 210 may be comprised within a radio resource control (RRC) message that eNB 102 transmits to D2D UE 106. In various embodiments, D2D configuration information 210 may specify the allocated wireless channel resources for the first D2D discovery period of the series. In some embodiments, D2D UE 106 may be able to determine the allocated wireless channel resources for the remaining D2D discovery periods of the series based on a defined recursive allocation scheme. In various embodiments, according to such a recursive allocation scheme, the respective allocated resources in each D2D discovery period following the first period in the series may generally be determined as a function of the allocations in one or more preceding periods. In a simple example of a recursive allocation scheme, the allocated resources in each D2D discovery period may be defined to comprise the same resource elements as are comprised in the preceding D2D discovery period.

In some embodiments, based on the D2D configuration information 210 that it receives from eNB 102, D2D UE 106 may identify wireless channel resources that it may use for D2D discovery transmissions and transmit D2D discovery signals 212 using some or all of those identified resources in order to enable itself to be discovered by other nearby D2D UEs. In the example of operating environment 200, D2D UE 108 may successfully receive the D2D discovery signals 212 that D2D UE 106 transmits, and may discover D2D UE 106 based on those signals. In various embodiments, one or more other D2D UEs may also successfully receive D2D discovery signals 212 and thereby discover D2D UE 106. The embodiments are not limited in this context.

In some embodiments, in the interest of goals such as minimizing the impact of the half-duplex constraint on UE's ability to both send and receive D2D discovery signals and randomizing the in-band emissions (IBE) interference associated with D2D discovery signal transmissions, it may be desirable to use a resource allocation scheme according to which the allocated subcarriers and/or subframes change across—and possibly within—D2D discovery periods. It may also be desirable that such a scheme be recursive, in order to minimize the overhead associated with transmission of D2D control information.

Disclosed herein are resource allocation techniques for D2D discovery that may be implemented in various embodiments in view of these considerations. According to some such techniques, a recursive resource hopping scheme may be used for D2D discovery resource allocation. In various embodiments, according to the resource hopping scheme, the subcarriers and/or subframes in which resources are allocated to a given D2D for transmission of D2D discovery signals may vary over a series of D2D discovery periods. In some such embodiments, these subcarrier and/or subframe variations may be defined by a period-specific cyclic shift. In various embodiments, RRC signaling may be used to provide D2D UEs with the information needed in order to apply the period-specific cyclic shift and identify the subcarriers and/or subframes that comprise allocated D2D discovery resources within any particular D2D discovery period. The embodiments are not limited in this context.

Figure 3:
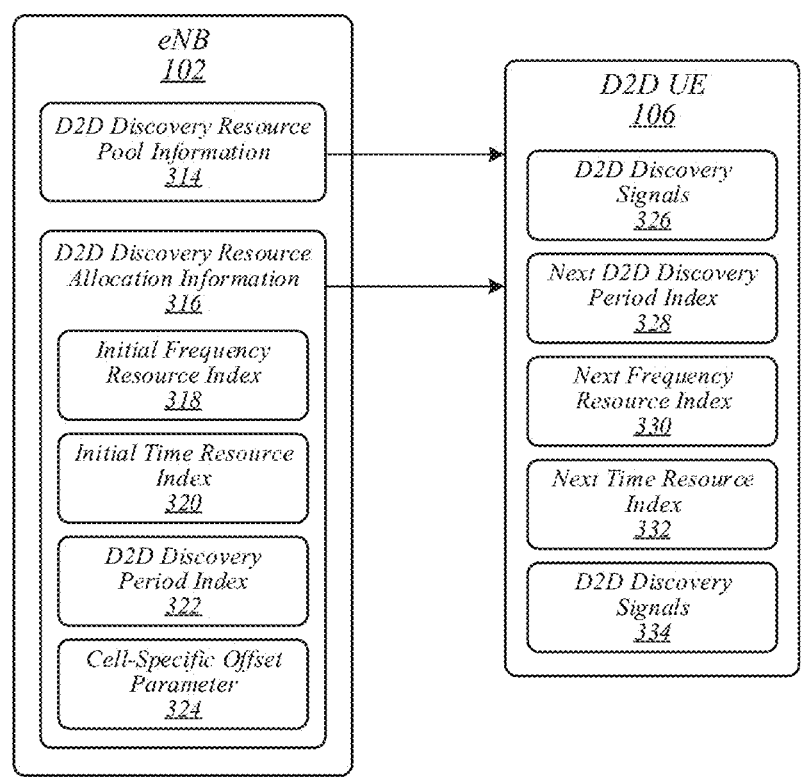
FIG. 3 illustrates an embodiment of a third operating environment.

FIG. 3 illustrates an example of an operating environment 300 that may be representative of the implementation of one or more of the disclosed resource allocation techniques for D2D discovery in some embodiments. In operating environment 300, eNB 102 may define a D2D discovery resource pool comprising a pool of resources for potential use by D2D UEs in its cell in transmitting D2D discovery signals. In various embodiments, eNB 102 may inform D2D UE 106 of the applicable defined D2D discovery resource pool by transmitting D2D discovery resource pool information 314. In some embodiments, in transmitting D2D discovery resource pool information 314, eNB 102 may also inform other D2D UEs in its cell of the applicable defined D2D discovery resource pool. In various embodiments, D2D discovery resource pool information 314 may be comprised within a system information block (SIB) that eNB 102 transmits to the various mobile devices located within its cell. In some such embodiments, the SIB may also comprise information indicating the duration of each D2D discovery period. The embodiments are not limited in this context.

In various embodiments, eNB 102 may allocate particular resources among those of the D2D discovery resource pool for use by D2D UE 106, in a UE-specific manner. In some embodiments, this allocation may comprise allocation of respective resources in each of a series of D2D discovery periods. In various embodiments, for example, eNB 102 may allocate resources to D2D UE 106 for D2D discovery signal transmissions in each of a series of Type 2/2B discovery periods, according to a Type 2/2B D2D discovery mode. In some embodiments, this allocation may be semi-persistent in nature. For example, in various embodiments, the allocation may apply until eNB 102 cancels it, D2D UE 106 discontinues D2D operations, or a predefined number of discovery periods or other time units have elapsed. In some embodiments, eNB 102 may transmit D2D discovery resource allocation information 316 in order to inform D2D UE 106 of the resources that it has allocated to D2D UE 106 from among those of the D2D discovery resource pool. In various embodiments, D2D discovery resource allocation information 316 may be comprised within an RRC message that eNB 102 transmits to D2D UE 106. The embodiments are not limited in this context.

In some embodiments, D2D discovery resource allocation information 316 may comprise information explicitly identifying allocated resources of an initial D2D discovery period, which may comprise a first D2D discovery period to commence following the receipt of D2D discovery resource allocation information 316 at D2D UE 106. In various embodiments, the allocated resources may comprise two contiguous physical resource blocks (PRBs) of a same subframe within the D2D discovery resource pool. In some embodiments, D2D discovery resource allocation information 316 may comprise an initial frequency resource index 318 indicating the location of the PRBs in the frequency dimension within the D2D discovery resource pool. In various embodiments, D2D discovery resource allocation information 316 may comprise an initial time resource index 320 indicating the subframe occupied by the PRBs in the time dimension within the D2D discovery resource pool. The embodiments are not limited in this context.

In some embodiments, D2D UE 106 may identify its allocated resources within the initial D2D discovery period based on initial frequency resource index 318 and initial time resource index 320. In various embodiments, D2D UE 106 may also use initial frequency resource index 318 and initial time resource index 320 to identify its allocated resources within subsequent D2D discovery periods based on a defined recursive allocation scheme. In some embodiments, according to the recursive allocation scheme, the allocated time and/or frequency resources of each D2D discovery period following the first D2D discovery period may be defined as a function of the allocated time and/or frequency resources of the initial D2D discovery period. In various embodiments the allocated time and/or frequency resources of each D2D discovery period following the first D2D discovery period may be defined as a function of the allocated time and/or frequency resources of the initial D2D discovery period and one or more additional parameters. In some such embodiments, a period-specific cyclic shift may be implemented in conjunction with the allocation of one or both of time resources and frequency resources, and thus the one or more additional parameters may include a D2D discovery period index.

In various embodiments, according to the recursive allocation scheme, the allocated time and frequency resources for a D2D discovery signal transmission during a D2D discovery period i may be defined according to the generalized functions $f_1$ and $f_2$ depicted in Equations (1) and (2), as follows:

$$nt_i = f_1(nf_{i-1}, nt_{i-1}, Nf, Nt, p) \quad (1)$$

$$nf_i = f_2(nf_{i-1}, nt_{i-1}, Nf, Nt, p) \quad (2)$$

where $nt_i$ represents a time resource index generally indicating the allocated time resources of the D2D discovery period i, $nf_i$ represents a frequency resource index generally indicating the allocated frequency resources of the D2D discovery period i, $nf_{i-1}$ represents a frequency resource index generally indicating the allocated frequency resources of a preceding D2D discovery period i−1, $nt_{i-1}$ represents a time resource index generally indicating the allocated time resources of the preceding D2D discovery period i−1, $Nf$ represents a configured number of D2D discovery resources per subframe, Nt represents a quotient comprising a configured number of D2D discovery subframes per D2D discovery period divided by a configured number of D2D discovery signal transmissions per D2D discovery period, and p represents a D2D discovery period index for the D2D discovery period i.

According to the generalized functions $f_1$ and $f_2$ in Equations (1) and (2), the D2D discovery period index p is used to implement a period-specific cyclic shift both with respect to time resources and frequency resources. However, in some embodiments, a period-specific cyclic shift may be implemented with respect to only one of these two dimensions. In various embodiments, a period-specific cyclic shift may be implemented with respect to time resources but not with respect to frequency resources. In some other embodiments, a period-specific cyclic shift may be implemented with respect to frequency resources but not with respect to time resources. In various embodiments, for example, the allocated time and frequency resources for a D2D discovery signal transmission during a D2D discovery period i may be defined according to Equations (3) and (4), as follows:

$$nt_i = (nt_{i-1} * Nf + nf_{i-1}) \bmod Nt \quad (3)$$

$$nf_i = \lfloor (nt_{i-1} * Nf + nf_{i-1} + p)/Nt \rfloor \bmod Nf \quad (4)$$

where mod represents the modulo operation and $\lfloor X \rfloor$ represents the largest integer that is not greater than X.

In some embodiments, both a period-specific cyclic shift and a cell-specific cyclic shift may be implemented with respect to time resources, frequency resources, or both. In various embodiments, for example, the allocated time and frequency resources for a D2D discovery signal transmission during a D2D discovery period i may be defined according to Equations (5), (6), and (7), as follows:

$$nt_i = (nt_{i-1} + nf_{i-1} + g(nf_{i-1})) \bmod Nt \quad (5)$$

$$g(nf_{i-1}) = \Sigma_{z=1}^{j} \lfloor nf_{i-1}/Nf^z \rfloor \quad (6)$$

$$nf_i = (nf_{i-1} + c + p) \bmod Nf \quad (7)$$

where j represents the largest integer for which $Nf^j < Nf$ and $c = \lfloor Nf/2 \rfloor$ or $c = \lfloor Nf/2 \rfloor + m$ where m is an integer such that c and Nf are relatively co-prime.

In another example, in some embodiments, the allocated time and frequency resources for a D2D discovery signal transmission during a D2D discovery period i may be defined according to Equations (8) and (9), as follows:

$$nt_i = (nt_{i-1} + nf_{i-1} + t\_shift) \bmod Nt \quad (8)$$

$$nf_i = (nf_{i-1} + \lfloor Nf/2 \rfloor + f\_shift + p) \bmod Nf \quad (9)$$

where t_shift represents a cell-specific cyclic shift in the time dimension and f_shift represents a cell-specific cyclic shift in the frequency dimension. In various embodiments, t_shift and/or f_shift may comprise cyclic shifts that are based on physical or virtual cell identifiers (IDs). For example, in some embodiments, t_shift and f_shift may be defined according to Equations (10) and (11), as follows:

$$t\_shift = N_{cell}^{ID} \bmod Nt \quad (10)$$

$$f\_shift = N_{cell}^{ID} \bmod Nf \quad (11)$$

where $N_{cell}^{ID}$ represents a physical or virtual cell ID.

In various embodiments, eNB 102 may be operative to send a D2D discovery period index 322 to D2D UE 106 in order to enable D2D UE 106 to identify its allocated D2D discovery transmission resources according to a recursive allocation scheme that implements a period-specific cyclic shift. In some embodiments, eNB 102 may use dedicated RRC signaling to send D2D discovery period index 322 to D2D UE 106. In various embodiments, for example, eNB 102 may transmit an RRC message to D2D UE 106 comprising D2D configuration information that includes initial frequency resource index 318, initial time resource index 320, and D2D discovery period index 322. In some other embodiments, eNB 102 may send D2D discovery period index 322 via Layer 1 signaling as part of a Type 2/2B D2D discovery resource allocation mechanism. For example, in various embodiments, eNB 102 may include D2D discovery period index 322 within downlink control information (DCI) that it transmits to D2D UE 106 to indicate the activation of the Type 2/2B resource allocation. In some such embodiments, initial frequency resource index 318 and initial time resource index 320, and related configuration information, may be sent to D2D UE 106 via dedicated RRC signaling, while the identity of the immediately next occurring Type 2/2B D2D discovery period may be indicated in conjunction with dynamic activation via Layer 1 signaling. In various embodiments, this approach may be realized following a mechanism similar to semi-persistent scheduling (SPS) activation/deactivation, or as part of grouped scheduling using DCI formats 3 and/or 3A. The embodiments are not limited in this context.

In some embodiments, the D2D discovery period index p may be defined in such a way as to enable D2D UEs such as D2D UE 106 to determine it autonomously. In various embodiments, for example, the D2D discovery period index p may be defined as a function of an LTE system frame number (SFN). In an example, the D2D discovery period index p for a D2D discovery period may be defined according to the generalized function $f_A$ depicted in Equation (12), as follows:

$$p = f_A(SFN) \quad (12)$$

where SFN represents the LTE SFN corresponding to the first subframe (or slot) or current subframe (or slot) of the Type 2/2B D2D discovery pool in the D2D discovery period. An example implementation of $f_A$ in some embodiments is depicted in Equation (13), as follows:

$$p = SFN \bmod p_{max} \quad (13)$$

where the D2D discovery period index p repeats cyclically within a set of values $\{0, 1, \ldots, p_{max}-1\}$ and thus $p_{max}$ represents the total number of possible values of the D2D discovery period index.

In various embodiments, the D2D discovery period index p may be defined as a function of the LTE SFN and the subframe number corresponding to the first subframe of the Type 2/2B resource pool in each discovery period. In an example, the D2D discovery period index p for a D2D discovery period may be defined according to the generalized function $f_B$ depicted in Equation (14), as follows:

$$p = f_B(SFN, n_{sf}) \quad (14)$$

where $n_{sf}$ represents the subframe number corresponding to the first subframe of the Type 2/2B D2D discovery pool in D2D discovery period. An example implementation of $f_B$ in some embodiments is depicted in Equation (15), as follows:

$$p = (10 * SFN + n_{sf}) \bmod p_{max} \quad (15)$$

In various embodiments, the LTE SFN may repeat cyclically within the set of values $\{0, 1, \ldots, 1023\}$, corresponding to an absolute time scale of 10.24 seconds. The embodiments are not limited in this context.

As noted above, in some embodiments, the D2D discovery period index p may repeat cyclically within a set of values $\{0, 1, \ldots, p_{max}-1\}$. In various embodiments, for example, $p_{max}$ may be defined to be equal to 10, and thus the D2D discovery period index p may repeat cyclically within the set of values $\{0, 1, \ldots, 9\}$. In some embodiments, the D2D discovery period index p may be incremented for each successive D2D discovery period until it reaches $p_{max}-1$, after which it may be reset to 0. For example, in various embodiments in which $p_{max}$ is equal to 10, the D2D discovery period index p may traverse the values 0 to 9 over a series of ten Type 2/2B D2D discovery periods, and then return to a value of 0 for an eleventh Type 2/2B D2D discovery period. The embodiments are not limited to this example.

In some embodiments, the value of the D2D discovery period index p may be selected in a random or pseudorandom manner from among the range of permitted values $\{0, 1, \ldots, p_{max}-1\}$. In various embodiments, for example, values of the D2D discovery period index p may be determined using the incumbent Gold-sequence as defined in 3GPP TS 36.211 v12.2.0 (released Jul. 3, 2014). For instance, the D2D discovery period index p for a D2D discovery period may be defined according to the generalized functions $f_C$ and $f_D$ depicted in Equations (16) and (17), as follows:

$$p(n) = \sum_{j=0}^{log2p_{max}-1} c(f_C(n,j)) * 2^j \qquad (16)$$

$$c = f_D(A) \qquad (17)$$

where n represents a time index and A represents a value configured by higher-layer signaling, such as a cell radio network temporary identifier (C-RNTI) or other UE identifier (ID), a physical cell ID, or a virtual cell ID. In some embodiments, n may be defined according to Equation (18), as follows:

$$n = 10 * SFN + n_{sf} \qquad (18)$$

In various other embodiments, n may comprise a transmission counter. An example implementation of $f_C$ in some embodiments is depicted in Equation (19), as follows:

$$p(n) = \sum_{j=0}^{log2p_{max}-1} c((log_2 p_{max} * n) + 1) * 2^j \qquad (19)$$

The embodiments are not limited to this example.

In various embodiments, eNB 102 may allocate resources for D2D discovery transmissions of D2D UE 106 according to an allocation scheme that features a cell-specific cyclic shift. In some embodiments, such a cell-specific cyclic shift may apply with respect to the time dimension, the frequency dimension, or both. In various embodiments, the cell-specific cyclic shift may be determined as a function of a physical cell ID or virtual cell ID associated with eNB 102. In some other embodiments, the cell-specific cyclic shift may be implemented via an independently configurable cell-specific offset parameter 324 that eNB 102 may select in order to substantially maximize the achievable degree of reuse with respect to D2D resource allocations across cells in its vicinity. In various embodiments, eNB 102 may send cell-specific offset parameter 324 to D2D UE 106 via RRC signaling. In some such embodiments, eNB 102 may include cell-specific offset parameter 324 within a same RRC message as one that comprises initial frequency resource index 318, initial time resource index 320, and D2D discovery period index 322. The embodiments are not limited in this context.

In various embodiments, before initiating D2D discovery signal transmissions, D2D UE 106 may receive D2D discovery resource pool information 314 and D2D discovery resource allocation information 316 from eNB 102. In some embodiments, D2D UE 106 may identify a D2D discovery resource pool based on D2D discovery resource pool information 314. In various embodiments, from among the D2D discovery resource pool, D2D UE 106 may then identify allocated resources for D2D discovery signal transmissions during a first D2D discovery period. In some embodiments, D2D UE 106 may identify the allocated resources for the first D2D discovery period based on initial frequency resource index 318 and initial time resource index 320. In various embodiments, D2D UE 106 may then transmit D2D discovery signals 326 during the first D2D discovery period using the allocated resources for the first D2D discovery period.

In some embodiments, the received D2D discovery resource allocation information 316 may comprise a D2D discovery period index 322 for the first D2D discovery period. In various such embodiments, D2D UE 106 may identify a next D2D discovery period index 328 for a next D2D discovery period based on D2D discovery period index 322. In some embodiments, D2D UE 106 may determine a next frequency resource index 330 and a next time resource index 332 for use in identifying allocated resources for D2D discovery signal transmissions during the next D2D discovery period. In various embodiments, D2D UE 106 may determine next frequency resource index 330 and next time resource index 332 based at least in part on initial frequency resource index 318 and initial time resource index 320. In some embodiments, in conjunction with the implementation of a period-specific cyclic shift with respect to the frequency and/or time dimensions, D2D UE 106 may determine one or both of next frequency resource index 330 and next time resource index 332 based additionally on D2D discovery period index 328. In various embodiments, for example, D2D UE 106 may determine a next frequency resource index 330 for the next D2D discovery period based on initial frequency resource index 318, initial time resource index 320, and next D2D discovery period index 328. In some embodiments, D2D UE 106 may identify the allocated resources for the next D2D discovery period based on next frequency resource index 330 and next time resource index 332. In various embodiments, D2D UE 106 may then transmit D2D discovery signals 334 during the next D2D discovery period using the allocated resources for the next D2D discovery period. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
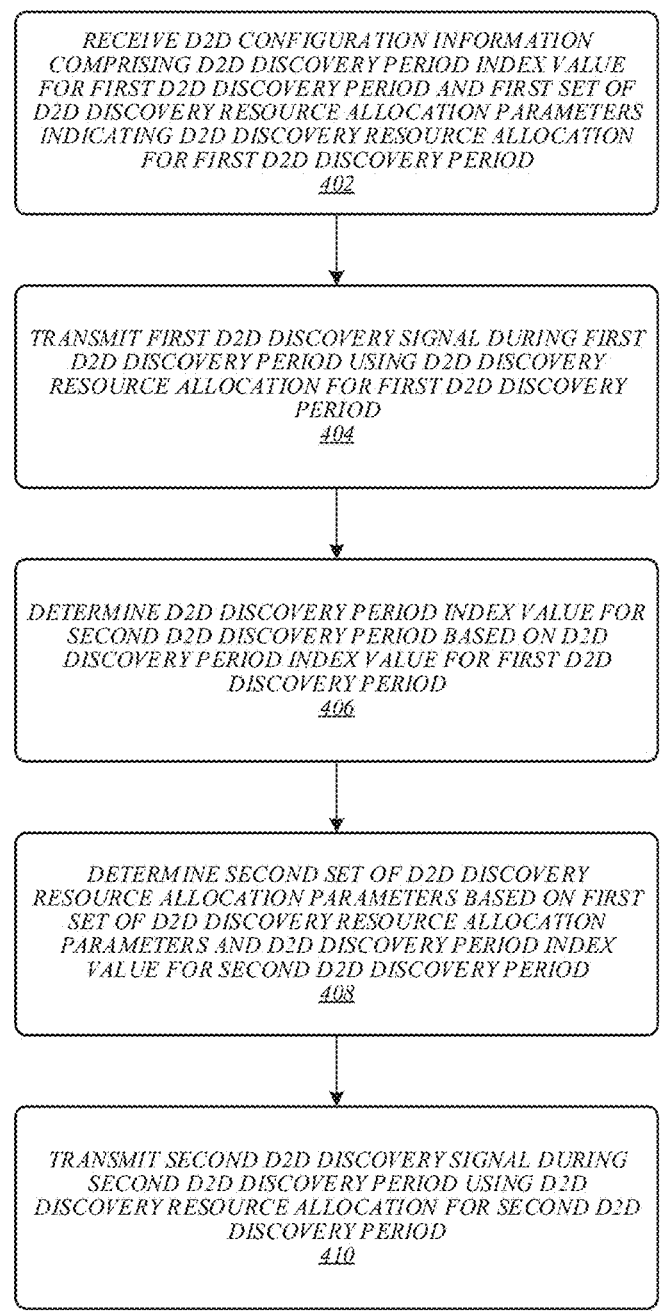
FIG. 4 illustrates an embodiment of a first logic flow.

FIG. 4 illustrates an embodiment of a logic flow 400 that may be representative of the implementation of one or more of the disclosed resource allocation techniques for D2D discovery in some embodiments. For example, logic flow 400 may be representative of operations that may be performed in various embodiments by D2D UE 106 in operating environment 300 of FIG. 3. As shown in FIG. 4, device-to-device (D2D) configuration information may be received at 402 that comprises a D2D discovery period index value for a first D2D discovery period and a first set of D2D discovery resource allocation parameters indicating a D2D discovery resource allocation for the first D2D discovery period. For example, D2D UE 106 of FIG. 3 may receive D2D discovery resource allocation information 316 from eNB 102, and D2D discovery resource allocation information 316 may comprise initial frequency resource index 318, initial time resource index 320, and D2D discovery period index 322. At 404, a first D2D discovery signal may be transmitted during the first D2D discovery period using the D2D discovery resource allocation for the first D2D discovery period. For example, D2D UE 106 of FIG. 3 may transmit a D2D discovery signal 326 during a first D2D discovery period using a D2D discovery resource allocation for that D2D discovery period.

At 406, a D2D discovery period index value may be determined for a second D2D discovery period based on the D2D discovery period index value for the first D2D discovery period. For example, D2D UE 106 of FIG. 3 may determine next D2D discovery period index 328 based on D2D discovery period index 322. At 408, a second set of D2D discovery resource allocation parameters may be determined based on the first set of D2D discovery resource allocation parameters and the D2D discovery period index value for the second D2D discovery period, where the second set of D2D discovery resource allocation parameters indicates a D2D discovery resource allocation for the second D2D discovery period. For example, D2D UE 106 of FIG. 3 may determine a set of D2D discovery resource allocation parameters comprising next frequency resource index 330 and next time resource index 332 based on a first set of D2D discovery resource allocation parameters comprised in D2D discovery resource allocation information 316 and on next D2D discovery period index 328. At 410, a second D2D discovery signal may be transmitted during the second D2D discovery period using the D2D discovery resource allocation for the second D2D discovery period. For example, D2D UE 106 of FIG. 3 may transmit D2D discovery signals 334 during the next D2D discovery period using a D2D discovery resource allocation indicated by next frequency resource index 330 and next time resource index 332. The embodiments are not limited to these examples.

Figure 5:
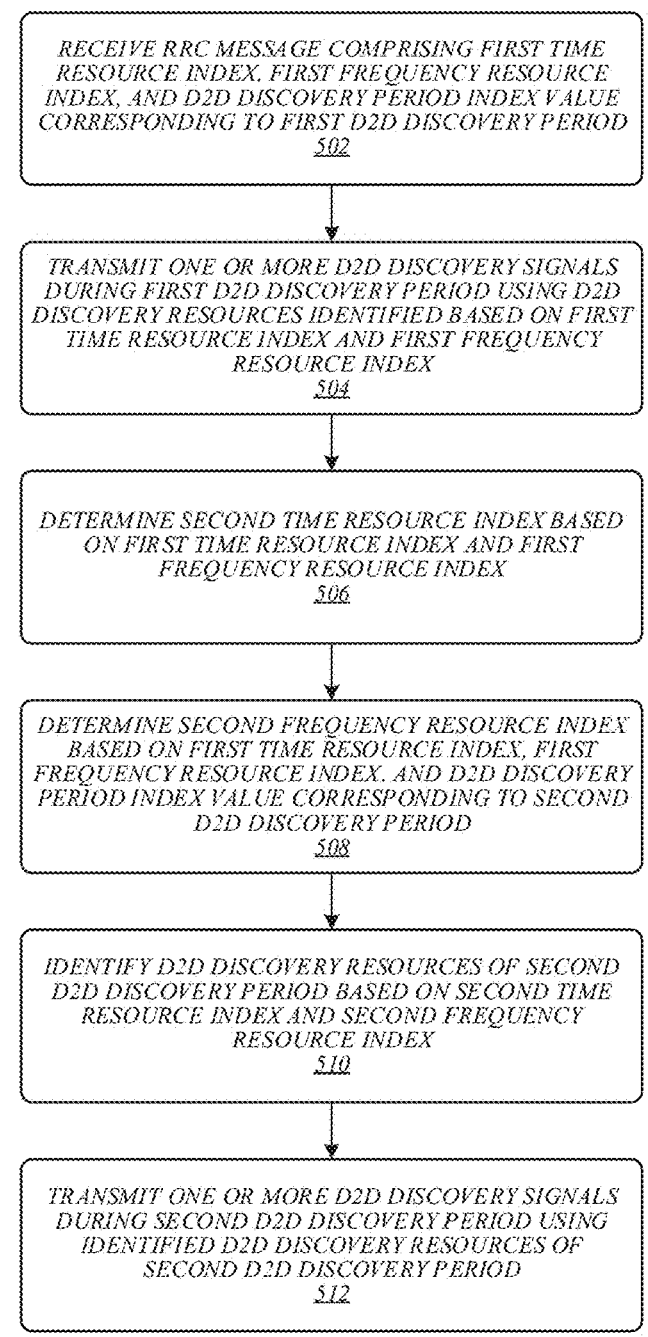
FIG. 5 illustrates an embodiment of a second logic flow.

FIG. 5 illustrates an embodiment of a logic flow 500 that may be representative of the implementation of one or more of the disclosed resource allocation techniques for D2D discovery in some embodiments. For example, logic flow 500 may be representative of operations that may be performed in various embodiments by D2D UE 106 in operating environment 300 of FIG. 3. As shown in FIG. 5, an RRC message may be received at 502 that comprises a first time resource index, a first frequency resource index, and a D2D discovery period index value corresponding to a first D2D discovery period. For example, D2D UE 106 of FIG. 3 may receive an RRC message that comprises D2D discovery resource allocation information 316, which in turn may comprise initial frequency resource index 318, initial time resource index 320, and a D2D discovery period index 322 comprising a value corresponding to a first D2D discovery period. At 504, one or more D2D discovery signals may be transmitted during the first D2D discovery period using D2D discovery resources identified based on the first time resource index and the first frequency resource index. For example, D2D UE 106 of FIG. 3 may transmit one or more D2D discovery signals 326 using D2D discovery resources identified based on initial frequency resource index 318 and initial time resource index 320. At 506, a second time resource index may be determined based on the first time resource index and the first frequency resource index. For example, D2D UE 106 of FIG. 3 may determine next time resource index 332 based on initial frequency resource index 318 and initial time resource index 320.

At 508, a second frequency resource index may be determined based on the first time resource index, the first frequency resource index, and a D2D discovery period index value corresponding to a second D2D discovery period. For example, D2D UE 106 of FIG. 3 may determine next frequency resource index 330 based on initial frequency resource index 318, initial time resource index 320, and next D2D discovery period index 328. At 510, D2D discovery resources of the second D2D discovery period may be identified based on the second time resource index and the second frequency resource index. For example, D2D UE 106 of FIG. 3 may identify D2D discovery resources of a next D2D discovery period based on next frequency resource index 330 and next time resource index 332. At 512, one or more D2D discovery signals may be transmitted during the second D2D discovery period using the identified D2D discovery resources of the second D2D discovery period. For example, D2D UE 106 of FIG. 3 may transmit one or more D2D discovery signals 334 during the next D2D discovery period using D2D discovery resources identified based on next frequency resource index 330 and next time resource index 332. The embodiments are not limited to these examples.

Figure 6:
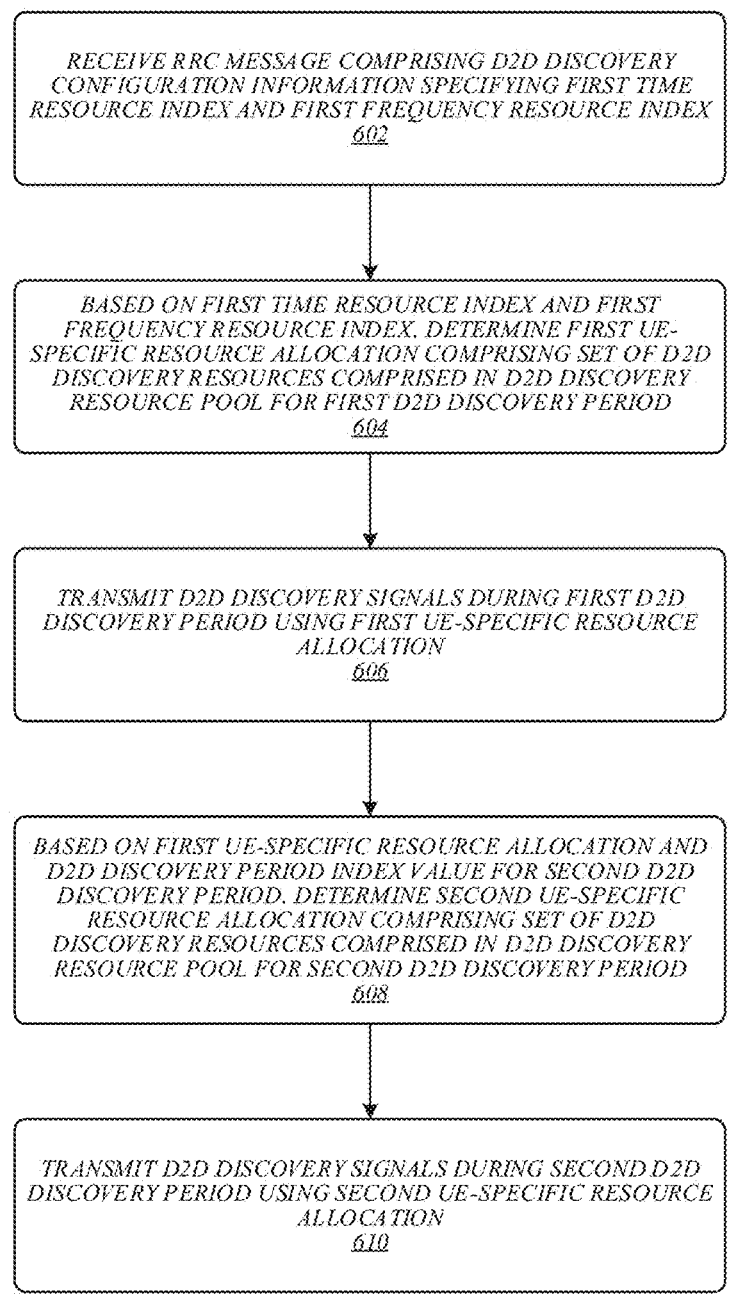
FIG. 6 illustrates an embodiment of a third logic flow.

FIG. 6 illustrates an embodiment of a logic flow 600 that may be representative of the implementation of one or more of the disclosed resource allocation techniques for D2D discovery in some embodiments. For example, logic flow 600 may be representative of operations that may be performed in various embodiments by D2D UE 106 in operating environment 300 of FIG. 3. As shown in FIG. 6, an RRC message may be received at 602 that comprises D2D discovery configuration information specifying a first time resource index and a first frequency resource index. For example, D2D UE 106 of FIG. 3 may receive an RRC message that comprises D2D discovery configuration information including initial frequency resource index 318 and initial time resource index 320. At 604, based on the first time resource index and the first frequency resource index, a first UE-specific resource allocation may be determined that comprises a set of D2D discovery resources comprised in a D2D discovery resource pool for a first D2D discovery period. For example, based on initial frequency resource index 318 and initial time resource index 320, D2D UE 106 of FIG. 3 may determine a first UE-specific resource allocation that comprises a set of D2D discovery resources comprised in a D2D discovery resource pool for a first D2D discovery period. At 606, D2D discovery signals may be transmitted during the first D2D discovery period using the first UE-specific resource allocation. For example, D2D UE 106 of FIG. 3 may transmit D2D discovery signals 326 during the first D2D discovery period using the first UE-specific resource allocation determined based on initial frequency resource index 318 and initial time resource index 320.

At 608, based on the first UE-specific resource allocation and a D2D discovery period index value for a second D2D discovery period, a second UE-specific resource allocation may be determined that comprises a set of D2D discovery resources comprised in a D2D discovery resource pool for the second D2D discovery period. For example, based on the first UE-specific resource allocation for the first D2D discovery period and on a next D2D discovery period index 328 value for a next D2D discovery period, D2D UE 106 of FIG. 3 may determine next frequency resource index 330 and next time resource index 332, which may define a next UE-specific resource allocation comprising a set of D2D discovery resources comprised in a D2D discovery resource pool for the next D2D discovery period. At 610, D2D discovery signals may be transmitted during the second D2D discovery period using the second UE-specific resource allocation. For example, D2D UE 106 of FIG. 3 may transmit D2D discovery signals 334 during the next D2D discovery period using the next UE-specific resource allocation determined at 608. The embodiments are not limited to these examples.

Figure 7:
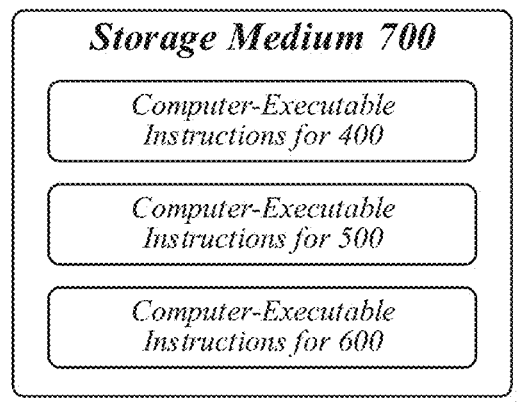
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flow 400 of FIG. 4, logic flow 500 of FIG. 5, and logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
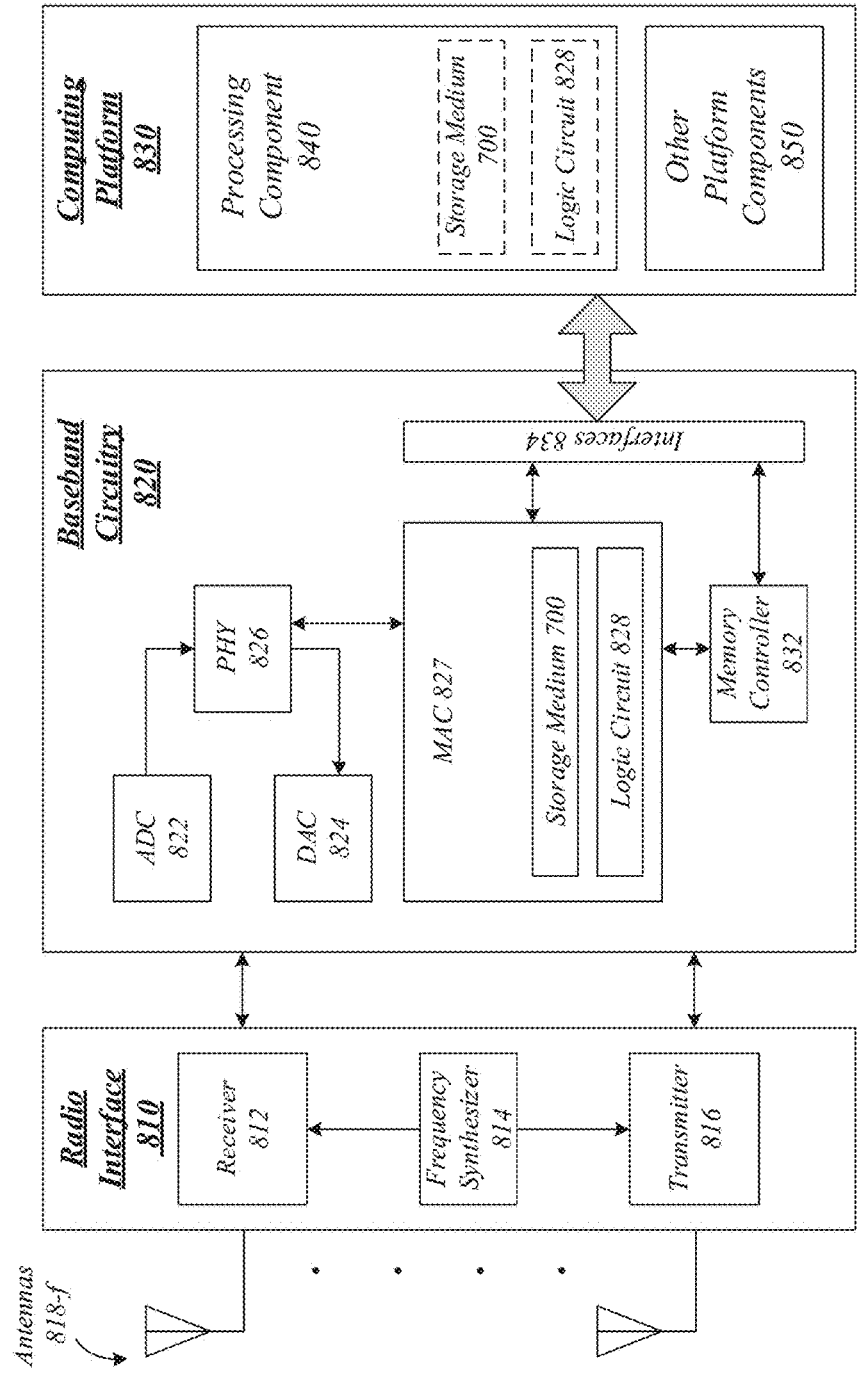
FIG. 8 illustrates an embodiment of a device.

FIG. 8 illustrates an embodiment of a communications device 800 that may implement one or more of eNB 102 and D2D UE 106 of FIG. 3, logic flow 400 of FIG. 4, logic flow 500 of FIG. 5, logic flow 600 of FIG. 6, and storage medium 700 of FIG. 7. In various embodiments, device 800 may comprise a logic circuit 828. The logic circuit 828 may include physical circuits to perform operations described for one or more of eNB 102 and D2D UE 106 of FIG. 3, logic flow 400 of FIG. 4, logic flow 500 of FIG. 5, and logic flow 600 of FIG. 6, for example. As shown in FIG. 8, device 800 may include a radio interface 810, baseband circuitry 820, and computing platform 830, although the embodiments are not limited to this configuration.

The device 800 may implement some or all of the structure and/or operations for one or more of eNB 102 and D2D UE 106 of FIG. 3, logic flow 400 of FIG. 4, logic flow 500 of FIG. 5, logic flow 600 of FIG. 6, storage medium 700 of FIG. 7, and logic circuit 828 in a single computing entity, such as entirely within a single device. Alternatively, the device 800 may distribute portions of the structure and/or operations for one or more of eNB 102 and D2D UE 106 of FIG. 3, logic flow 400 of FIG. 4, logic flow 500 of FIG. 5, logic flow 600 of FIG. 6, storage medium 700 of FIG. 7, and logic circuit 828 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 810 may include, for example, a receiver 812, a frequency synthesizer 814, and/or a transmitter 816. Radio interface 810 may include bias controls, a crystal oscillator and/or one or more antennas 818-f. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a medium access control (MAC) processing circuit 827 for MAC/data link layer processing. Baseband circuitry 820 may include a memory controller 832 for communicating with MAC processing circuit 827 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for one or more of eNB 102 and D2D UE 106 of FIG. 3, logic flow 400 of FIG. 4, logic flow 500 of FIG. 5, logic flow 600 of FIG. 6, storage medium 700 of FIG. 7, and logic circuit 828 using the processing component 840. The processing component 840 (and/or PHY 826 and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 818-*f*) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 9 illustrates an embodiment of a broadband wireless access system 900. As shown in FIG. 9, broadband wireless access system 900 may be an internet protocol (IP) type network comprising an internet 910 type network or the like that is capable of supporting mobile wireless access and/or fixed wireless access to internet 910. In one or more embodiments, broadband wireless access system 900 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 900, radio access networks (RANs) 912 and 918 are capable of coupling with evolved node Bs (eNBs) 914 and 920, respectively, to provide wireless communication between one or more fixed devices 916 and internet 910 and/or between or one or more mobile devices 922 and Internet 910. One example of a fixed device 916 and a mobile device 922 is device 800 of FIG. 8, with the fixed device 916 comprising a stationary version of device 800 and the mobile device 922 comprising a mobile version of device 800. RANs 912 and 918 may implement profiles that are capable of defining the mapping of network functions to one or more physical entities on broadband wireless access system 900. eNBs 914 and 920 may comprise radio equipment to provide RF communication with fixed device 916 and/or mobile device 922, such as described with reference to device 800, and may comprise, for example, the PHY and MAC layer equipment in compliance with a 3GPP LTE Specification or an IEEE 802.16 Standard. eNBs 914 and 920 may further comprise an IP backplane to couple to Internet 910 via RANs 912 and 918, respectively, although the scope of the claimed subject matter is not limited in these respects.

Broadband wireless access system 900 may further comprise a visited core network (CN) 924 and/or a home CN 926, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 924 and/or home CN 926, and the scope of the claimed subject matter is not limited in these respects. Visited CN 924 may be referred to as a visited CN in the case where visited CN 924 is not part of the regular service provider of fixed device 916 or mobile device 922, for example where fixed device 916 or mobile device 922 is roaming away from its respective home CN 926, or where broadband wireless access system 900 is part of the regular service provider of fixed device 916 or mobile device 922 but where broadband wireless access system 900 may be in another location or state that is not the main or home location of fixed device 916 or mobile device 922. The embodiments are not limited in this context.

Fixed device 916 may be located anywhere within range of one or both of eNBs 914 and 920, such as in or near a home or business to provide home or business customer broadband access to Internet 910 via eNBs 914 and 920 and RANs 912 and 918, respectively, and home CN 926. It is worthy of note that although fixed device 916 is generally disposed in a stationary location, it may be moved to different locations as needed. Mobile device 922 may be utilized at one or more locations if mobile device 922 is within range of one or both of eNBs 914 and 920, for example. In accordance with one or more embodiments, operation support system (OSS) 928 may be part of broadband wireless access system 900 to provide management functions for broadband wireless access system 900 and to provide interfaces between functional entities of broadband wireless access system 900. Broadband wireless access system 900 of FIG. 9 is merely one type of wireless network showing a certain number of the components of broadband wireless access system 900, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following Examples pertain to further embodiments:

Example 1 is user equipment (UE), comprising at least one radio frequency (RF) transceiver to receive device-to-device (D2D) configuration information comprising a D2D discovery period index value for a first D2D discovery period and a first set of D2D discovery resource allocation parameters indicating a D2D discovery resource allocation for the first D2D discovery period and transmit a first D2D discovery signal during the first D2D discovery period using the D2D discovery resource allocation for the first D2D discovery period, and logic, at least a portion of which is in hardware, the logic to determine a D2D discovery period index value for a second D2D discovery period based on the D2D discovery period index value for the first D2D discovery period and determine a second set of D2D discovery resource allocation parameters based on the first set of D2D discovery resource allocation parameters and the D2D discovery period index value for the second D2D discovery period, the second set of D2D discovery resource allocation parameters to indicate a D2D discovery resource allocation for the second D2D discovery period.

Example 2 is the UE of Example 1, the first set of D2D discovery resource allocation parameters to comprise a first D2D discovery frequency resource index and a first D2D discovery time resource index, the second set of D2D discovery resource allocation parameters to comprise a second D2D discovery frequency resource index and a second D2D discovery time resource index.

Example 3 is the UE of Example 2, the logic to determine the second D2D discovery frequency resource index based on the first D2D discovery frequency resource index, the first D2D discovery time resource index, and the D2D discovery period index value for the second D2D discovery period.

Example 4 is the UE of Example 2, the logic to determine the second D2D discovery time resource index without reference to the D2D discovery period index value for the second D2D discovery period.

Example 5 is the UE of Example 2, the logic to determine the second D2D discovery time resource index based on a cell-specific shift parameter comprised in the D2D configuration information.

Example 6 is the UE of Example 1, the logic to determine the D2D discovery period index value for the second D2D discovery period based on the D2D discovery period index value for the first D2D discovery period and a maximum permissible D2D discovery period index value.

Example 7 is the UE of Example 6, the logic to determine a value of 0 for the D2D discovery period index value for the second D2D discovery period in response to a determination that the D2D discovery period index value for the first D2D discovery period is equal to the maximum permissible D2D discovery period index value.

Example 8 is the UE of Example 1, the at least one RF transceiver to transmit a second D2D discovery signal during the second D2D discovery period using the D2D discovery resource allocation for the second D2D discovery period.

Example 9 is the UE of any of Examples 1 to 8, comprising at least one memory unit, and a touchscreen display.

Example 10 is at least one non-transitory computer-readable storage medium comprising a set of wireless communication instructions that, in response to being executed at user equipment (UE), cause the UE to transmit one or more device-to-device (D2D) discovery signals during a first D2D discovery period using D2D discovery resources identified based on a first time resource index and a first frequency resource index, determine a second time resource index based on the first time resource index and the first frequency resource index, determine a second frequency resource index based on the first time resource index, the first frequency resource index, and a D2D discovery period index value corresponding to a second D2D discovery period, and identify D2D discovery resources of the second D2D discovery period based on the second time resource index and the second frequency resource index.

Example 11 is the at least one non-transitory computer-readable storage medium of Example 10, comprising wireless communication instructions that, in response to being executed at the UE, cause the UE to transmit one or more D2D discovery signals during the second D2D discovery period using the identified D2D discovery resources of the second D2D discovery period.

Example 12 is the at least one non-transitory computer-readable storage medium of Example 10, comprising wireless communication instructions that, in response to being executed at the UE, cause the UE to receive a radio resource control (RRC) message comprising the first time resource index, the first frequency resource index, and a D2D discovery period index value corresponding to the first D2D discovery period.

Example 13 is the at least one non-transitory computer-readable storage medium of Example 12, comprising wireless communication instructions that, in response to being executed at the UE, cause the UE to determine the D2D discovery period index value corresponding to the second D2D discovery period based on the D2D discovery period index value corresponding to the first D2D discovery period and a defined maximum D2D discovery period index value.

Example 14 is the at least one non-transitory computer-readable storage medium of Example 13, comprising wireless communication instructions that, in response to being executed at the UE, cause the UE to determine the D2D discovery period index value corresponding to the second D2D discovery period by incrementing the D2D discovery period index value corresponding to the first D2D discovery period in response to a determination that the D2D discovery period index value corresponding to the first D2D discovery period is less than the defined maximum D2D discovery period index value, and determine the D2D discovery period index value corresponding to the second D2D discovery period to be equal to 0 in response to a determination that the D2D discovery period index value corresponding to the first D2D discovery period is equal to the defined maximum D2D discovery period index value.

Example 15 is the at least one non-transitory computer-readable storage medium of Example 12, comprising wireless communication instructions that, in response to being executed at the UE, cause the UE to determine the second time resource index based on a cell-specific shift parameter comprised in the RRC message.

Example 16 is the at least one non-transitory computer-readable storage medium of Example 10, comprising wireless communication instructions that, in response to being executed at the UE, cause the UE to determine the second time resource index without reference to the D2D discovery period index value corresponding to the second D2D discovery period.

Example 17 is the at least one non-transitory computer-readable storage medium of Example 10, comprising wireless communication instructions that, in response to being executed at the UE, cause the UE to determine multiple frequency resource indices for the second D2D discovery period based the first time resource index, the first frequency resource index, the D2D discovery period index value corresponding to the second D2D discovery period, and a number of D2D discovery medium access control (MAC) protocol data units (PDUs) to be transmitted during the second D2D discovery period, and transmit the D2D MAC PDUs during the second D2D discovery period using frequency resources indicated by the multiple frequency resources indices.

Example 18 is the at least one non-transitory computer-readable storage medium of Example 10, comprising wireless communication instructions that, in response to being executed at the UE, cause the UE to determine the second time resource index and the second frequency resource index based on a parameter indicating a number of D2D discovery subframes comprised in the second D2D discovery period.

Example 19 is a wireless communication apparatus, comprising logic, at least a portion of which is in hardware, the logic to receive a radio resource control (RRC) message comprising device-to-device (D2D) discovery configuration information specifying a first time resource index and a first frequency resource index, determine a first user equipment (UE)-specific resource allocation comprising a set of D2D discovery resources comprised in a D2D discovery resource pool for a first D2D discovery period, the first UE-specific resource allocation to be determined based on the first time resource index and the first frequency resource index, the logic to transmit D2D discovery signals during the first D2D discovery period using the first UE-specific resource allocation and determine a second UE-specific resource allocation comprising a set of D2D discovery resources comprised in a D2D discovery resource pool for a second D2D discovery period, the second UE-specific resource allocation to be determined based on the first UE-specific resource allocation and a D2D discovery period index value for the second D2D discovery period.

Example 20 is the wireless communication apparatus of Example 19, the logic to transmit D2D discovery signals during the second D2D discovery period using the second UE-specific resource allocation.

Example 21 is the wireless communication apparatus of Example 19, the logic to determine a set of D2D discovery resource allocation parameters for the second D2D discovery period based on the first time resource index, the first frequency resource index, and the D2D discovery period index value for the second D2D discovery period, the set of D2D discovery resource allocation parameters to comprise a second time resource index and a second frequency resource index, the logic to determine the second UE-specific resource allocation based on the set of D2D discovery resource allocation parameters.

Example 22 is the wireless communication apparatus of Example 21, the logic to determine the second frequency resource index based on the first time resource index, the first frequency resource index, and the D2D discovery period index value for the second D2D discovery period.

Example 23 is the wireless communication apparatus of Example 21, the logic to determine the second time resource index without reference to the D2D discovery period index value for the second D2D discovery period.

Example 24 is the wireless communication apparatus of Example 21, the logic to determine the second time resource index based on a cell-specific shift parameter comprised in the D2D discovery configuration information.

Example 25 is the wireless communication apparatus of Example 19, the logic to determine the D2D discovery period index value for the second D2D discovery period based on a D2D discovery period index value for the first D2D discovery period, the D2D discovery period index value for the first D2D discovery period to be comprised in the D2D discovery configuration information.

Example 26 is the wireless communication apparatus of Example 25, the logic to determine the D2D discovery period index value for the second D2D discovery period based on the D2D discovery period index value for the first D2D discovery period and a defined maximum D2D discovery period index value.

Example 27 is user equipment (UE), comprising an apparatus according to any of Examples 19 to 26, at least one radio frequency (RF) transceiver, and at least one RF antenna.

Example 28 is the UE of Example 27, comprising at least one memory unit, and a touchscreen display.

Example 29 is a wireless communication method, comprising transmitting, by user equipment (UE), one or more device-to-device (D2D) discovery signals during a first D2D discovery period using D2D discovery resources identified based on a first time resource index and a first frequency resource index, determining, by processing circuitry of the UE, a second time resource index based on the first time resource index and the first frequency resource index, determining a second frequency resource index based on the first time resource index, the first frequency resource index, and a D2D discovery period index value corresponding to a second D2D discovery period, and identifying D2D discovery resources of the second D2D discovery period based on the second time resource index and the second frequency resource index.

Example 30 is the wireless communication method of Example 29, comprising transmitting one or more D2D discovery signals during the second D2D discovery period using the identified D2D discovery resources of the second D2D discovery period.

Example 31 is the wireless communication method of Example 29, comprising receiving a radio resource control (RRC) message comprising the first time resource index, the first frequency resource index, and a D2D discovery period index value corresponding to the first D2D discovery period.

Example 32 is the wireless communication method of Example 31, comprising determining the D2D discovery period index value corresponding to the second D2D discovery period based on the D2D discovery period index value corresponding to the first D2D discovery period and a defined maximum D2D discovery period index value.

Example 33 is the wireless communication method of Example 32, comprising determining the D2D discovery period index value corresponding to the second D2D discovery period by incrementing the D2D discovery period index value corresponding to the first D2D discovery period in response to a determination that the D2D discovery period index value corresponding to the first D2D discovery period is less than the defined maximum D2D discovery period index value, and determining the D2D discovery period index value corresponding to the second D2D discovery period to be equal to 0 in response to a determination that the D2D discovery period index value corresponding to the first D2D discovery period is equal to the defined maximum D2D discovery period index value.

Example 34 is the wireless communication method of Example 31, comprising determining the second time resource index based on a cell-specific shift parameter comprised in the RRC message.

Example 35 is the wireless communication method of Example 29, comprising determining the second time resource index without reference to the D2D discovery period index value corresponding to the second D2D discovery period.

Example 36 is the wireless communication method of Example 29, comprising Example determining multiple frequency resource indices for the second D2D discovery period based the first time resource index, the first frequency resource index, the D2D discovery period index value corresponding to the second D2D discovery period, and a number of D2D discovery medium access control (MAC) protocol data units (PDUs) to be transmitted during the second D2D discovery period, and transmitting the D2D MAC PDUs during the second D2D discovery period using frequency resources indicated by the multiple frequency resources indices.

Example 37 is the wireless communication method of Example 29, comprising determining the second time resource index and the second frequency resource index based on a parameter indicating a number of D2D discovery subframes comprised in the second D2D discovery period.

Example 38 is at least one non-transitory computer-readable storage medium comprising a set of instructions that, in response to being executed on a computing device, cause the computing device to perform a wireless communication method according to any of Examples 29 to 37.

Example 39 is an apparatus, comprising means for performing a wireless communication method according to any of Examples 29 to 37.

Example 40 is a system, comprising the apparatus of Example 39, at least one radio frequency (RF) transceiver, and at least one RF antenna.

Example 41 is the system of Example 40, comprising at least one memory unit, and a touchscreen display.

Example 42 is at least one non-transitory computer-readable storage medium comprising a set of wireless communication instructions that, in response to being executed at user equipment (UE), cause the UE to receive a radio resource control (RRC) message comprising device-to-device (D2D) discovery configuration information specifying a first time resource index and a first frequency resource index, determine a first user equipment (UE)-specific resource allocation comprising a set of D2D discovery resources comprised in a D2D discovery resource pool for a first D2D discovery period, the first UE-specific resource allocation to be determined based on the first time resource index and the first frequency resource index, transmit D2D discovery signals during the first D2D discovery period using the first UE-specific resource allocation, and determine a second UE-specific resource allocation comprising a set of D2D discovery resources comprised in a D2D discovery resource pool for a second D2D discovery period, the second UE-specific resource allocation to be determined based on the first UE-specific resource allocation and a D2D discovery period index value for the second D2D discovery period.

Example 43 is the at least one non-transitory computer-readable storage medium of Example 42, comprising wireless communication instructions that, in response to being executed at the UE, cause the UE to transmit D2D discovery signals during the second D2D discovery period using the second UE-specific resource allocation.

Example 44 is the at least one non-transitory computer-readable storage medium of Example 42, comprising wireless communication instructions that, in response to being executed at the UE, cause the UE to determine a set of D2D discovery resource allocation parameters for the second D2D discovery period based on the first time resource index, the first frequency resource index, and the D2D discovery period index value for the second D2D discovery period, the set of D2D discovery resource allocation parameters to comprise a second time resource index and a second frequency resource index, and determine the second UE-specific resource allocation based on the set of D2D discovery resource allocation parameters.

Example 45 is the at least one non-transitory computer-readable storage medium of Example 44, comprising wireless communication instructions that, in response to being executed at the UE, cause the UE to determine the second frequency resource index based on the first time resource index, the first frequency resource index, and the D2D discovery period index value for the second D2D discovery period.

Example 46 is the at least one non-transitory computer-readable storage medium of Example 44, comprising wireless communication instructions that, in response to being executed at the UE, cause the UE to determine the second time resource index without reference to the D2D discovery period index value for the second D2D discovery period.

Example 47 is the at least one non-transitory computer-readable storage medium of Example 44, comprising wireless communication instructions that, in response to being executed at the UE, cause the UE to determine the second time resource index based on a cell-specific shift parameter comprised in the D2D discovery configuration information.

Example 48 is the at least one non-transitory computer-readable storage medium of Example 42, comprising wireless communication instructions that, in response to being executed at the UE, cause the UE to determine the D2D discovery period index value for the second D2D discovery period based on a D2D discovery period index value for the first D2D discovery period, the D2D discovery period index value for the first D2D discovery period to be comprised in the D2D discovery configuration information.

Example 49 is the at least one non-transitory computer-readable storage medium of Example 48, comprising wireless communication instructions that, in response to being executed at the UE, cause the UE to determine the D2D discovery period index value for the second D2D discovery period based on the D2D discovery period index value for the first D2D discovery period and a defined maximum D2D discovery period index value.

Example 50 is a wireless communication apparatus, comprising logic, at least a portion of which is in hardware, the logic to receive device-to-device (D2D) configuration information comprising a D2D discovery period index value for a first D2D discovery period and a first set of D2D discovery resource allocation parameters indicating a D2D discovery resource allocation for the first D2D discovery period, transmit a first D2D discovery signal during the first D2D discovery period using the D2D discovery resource allocation for the first D2D discovery period, determine a D2D discovery period index value for a second D2D discovery period based on the D2D discovery period index value for the first D2D discovery period, and determine a second set of D2D discovery resource allocation parameters based on the first set of D2D discovery resource allocation parameters and the D2D discovery period index value for the second D2D discovery period, the second set of D2D discovery resource allocation parameters to indicate a D2D discovery resource allocation for the second D2D discovery period.

Example 51 is the wireless communication apparatus of Example 50, the first set of D2D discovery resource allocation parameters to comprise a first D2D discovery frequency resource index and a first D2D discovery time resource index, the second set of D2D discovery resource allocation parameters to comprise a second D2D discovery frequency resource index and a second D2D discovery time resource index.

Example 52 is the wireless communication apparatus of Example 51, the logic to determine the second D2D discovery frequency resource index based on the first D2D discovery frequency resource index, the first D2D discovery time resource index, and the D2D discovery period index value for the second D2D discovery period.

Example 53 is the wireless communication apparatus of Example 51, the logic to determine the second D2D discovery time resource index without reference to the D2D discovery period index value for the second D2D discovery period.

Example 54 is the wireless communication apparatus of Example 51, the logic to determine the second D2D discovery time resource index based on a cell-specific shift parameter comprised in the D2D configuration information.

Example 55 is the wireless communication apparatus of Example 50, the logic to determine the D2D discovery period index value for the second D2D discovery period based on the D2D discovery period index value for the first D2D discovery period and a maximum permissible D2D discovery period index value.

Example 56 is the wireless communication apparatus of Example 55, the logic to determine a value of 0 for the D2D discovery period index value for the second D2D discovery period in response to a determination that the D2D discovery period index value for the first D2D discovery period is equal to the maximum permissible D2D discovery period index value.

Example 57 is the wireless communication apparatus of Example 50, the logic to transmit a second D2D discovery signal during the second D2D discovery period using the D2D discovery resource allocation for the second D2D discovery period.

Example 58 is user equipment (UE), comprising an apparatus according to any of Examples 50 to 57, at least one radio frequency (RF) transceiver, and at least one RF antenna.

Example 59 is the UE of Example 58, comprising at least one memory unit, and a touchscreen display.

Example 60 is a wireless communication method, comprising receiving, at user equipment (UE), a radio resource control (RRC) message comprising device-to-device (D2D) discovery configuration information specifying a first time resource index and a first frequency resource index, determining, by processing circuitry of the UE, a first user equipment (UE)-specific resource allocation comprising a set of D2D discovery resources comprised in a D2D discovery resource pool for a first D2D discovery period, the first UE-specific resource allocation to be determined based on the first time resource index and the first frequency resource index, transmitting D2D discovery signals during the first D2D discovery period using the first UE-specific resource allocation, and determining a second UE-specific resource allocation comprising a set of D2D discovery resources comprised in a D2D discovery resource pool for a second D2D discovery period, the second UE-specific resource allocation to be determined based on the first UE-specific resource allocation and a D2D discovery period index value for the second D2D discovery period.

Example 61 is the wireless communication method of Example 60, comprising transmitting D2D discovery signals during the second D2D discovery period using the second UE-specific resource allocation.

Example 62 is the wireless communication method of Example 60, comprising determining a set of D2D discovery resource allocation parameters for the second D2D discovery period based on the first time resource index, the first frequency resource index, and the D2D discovery period index value for the second D2D discovery period, the set of D2D discovery resource allocation parameters to comprise a second time resource index and a second frequency resource index, and determining the second UE-specific resource allocation based on the set of D2D discovery resource allocation parameters.

Example 63 is the wireless communication method of Example 62, comprising determining the second frequency resource index based on the first time resource index, the first frequency resource index, and the D2D discovery period index value for the second D2D discovery period.

Example 64 is the wireless communication method of Example 62, comprising determining the second time resource index without reference to the D2D discovery period index value for the second D2D discovery period.

Example 65 is the wireless communication method of Example 62, comprising determining the second time resource index based on a cell-specific shift parameter comprised in the D2D discovery configuration information.

Example 66 is the wireless communication method of Example 60, comprising determining the D2D discovery period index value for the second D2D discovery period based on a D2D discovery period index value for the first D2D discovery period, the D2D discovery period index value for the first D2D discovery period to be comprised in the D2D discovery configuration information.

Example 67 is the wireless communication method of Example 66, comprising determining the D2D discovery period index value for the second D2D discovery period based on the D2D discovery period index value for the first D2D discovery period and a defined maximum D2D discovery period index value.

Example 68 is at least one non-transitory computer-readable storage medium comprising a set of instructions that, in response to being executed on a computing device, cause the computing device to perform a wireless communication method according to any of Examples 60 to 67.

Example 69 is an apparatus, comprising means for performing a wireless communication method according to any of Examples 60 to 67.

Example 70 is a system, comprising the apparatus of Example 69, at least one radio frequency (RF) transceiver, and at least one RF antenna.

Example 71 is the system of Example 70, comprising at least one memory unit, and a touchscreen display.

Example 72 is a wireless communication apparatus, comprising means for receiving device-to-device (D2D) configuration information comprising a D2D discovery period index value for a first D2D discovery period and a first set of D2D discovery resource allocation parameters indicating a D2D discovery resource allocation for the first D2D discovery period, means for transmitting a first D2D discovery signal during the first D2D discovery period using the D2D discovery resource allocation for the first D2D discovery period, means for determining a D2D discovery period index value for a second D2D discovery period based on the D2D discovery period index value for the first D2D discovery period, and means for determining a second set of D2D discovery resource allocation parameters based on the first set of D2D discovery resource allocation parameters and the D2D discovery period index value for the second D2D discovery period, the second set of D2D discovery resource allocation parameters to indicate a D2D discovery resource allocation for the second D2D discovery period.

Example 72 is the wireless communication apparatus of Example 72, the first set of D2D discovery resource allocation parameters to comprise a first D2D discovery frequency resource index and a first D2D discovery time resource index, the second set of D2D discovery resource allocation parameters to comprise a second D2D discovery frequency resource index and a second D2D discovery time resource index.

Example 74 is the wireless communication apparatus of Example 73, comprising means for determining the second D2D discovery frequency resource index based on the first D2D discovery frequency resource index, the first D2D discovery time resource index, and the D2D discovery period index value for the second D2D discovery period.

Example 75 is the wireless communication apparatus of Example 73, comprising means for determining the second D2D discovery time resource index without reference to the D2D discovery period index value for the second D2D discovery period.

Example 76 is the wireless communication apparatus of Example 73, comprising means for determining the second D2D discovery time resource index based on a cell-specific shift parameter comprised in the D2D configuration information.

Example 77 is the wireless communication apparatus of Example 72, comprising means for determining the D2D discovery period index value for the second D2D discovery period based on the D2D discovery period index value for the first D2D discovery period and a maximum permissible D2D discovery period index value.

Example 78 is the wireless communication apparatus of Example 77, comprising means for determining a value of 0 for the D2D discovery period index value for the second D2D discovery period in response to a determination that the D2D discovery period index value for the first D2D discovery period is equal to the maximum permissible D2D discovery period index value.

Example 79 is the wireless communication apparatus of Example 72, comprising means for transmitting a second D2D discovery signal during the second D2D discovery period using the D2D discovery resource allocation for the second D2D discovery period.

Example 80 is a system, comprising an apparatus according to any of Examples 72 to 79, at least one radio frequency (RF) transceiver, and at least one RF antenna.

Example 81 is the system of Example 80, comprising at least one memory unit, and a touchscreen display.

Example 82 is a wireless communication apparatus, comprising logic, at least a portion of which is in hardware, the logic to transmit one or more device-to-device (D2D) discovery signals during a first D2D discovery period using D2D discovery resources identified based on a first time resource index and a first frequency resource index, determine a second time resource index based on the first time resource index and the first frequency resource index, determine a second frequency resource index based on the first time resource index, the first frequency resource index, and a D2D discovery period index value corresponding to a second D2D discovery period, and identify D2D discovery resources of the second D2D discovery period based on the second time resource index and the second frequency resource index.

Example 83 is the wireless communication apparatus of Example 82, the logic to transmit one or more D2D discovery signals during the second D2D discovery period using the identified D2D discovery resources of the second D2D discovery period.

Example 84 is the wireless communication apparatus of Example 82, the logic to receive a radio resource control (RRC) message comprising the first time resource index, the first frequency resource index, and a D2D discovery period index value corresponding to the first D2D discovery period.

Example 85 is the wireless communication apparatus of Example 84, the logic to determine the D2D discovery period index value corresponding to the second D2D discovery period based on the D2D discovery period index value corresponding to the first D2D discovery period and a defined maximum D2D discovery period index value.

Example 86 is the wireless communication apparatus of Example 85, the logic to determine the D2D discovery period index value corresponding to the second D2D discovery period by incrementing the D2D discovery period index value corresponding to the first D2D discovery period in response to a determination that the D2D discovery period index value corresponding to the first D2D discovery period is less than the defined maximum D2D discovery period index value, and determine the D2D discovery period index value corresponding to the second D2D discovery period to be equal to 0 in response to a determination that the D2D discovery period index value corresponding to the first D2D discovery period is equal to the defined maximum D2D discovery period index value.

Example 87 is the wireless communication apparatus of Example 84, the logic to determine the second time resource index based on a cell-specific shift parameter comprised in the RRC message.

Example 88 is the wireless communication apparatus of Example 82, the logic to determine the second time resource index without reference to the D2D discovery period index value corresponding to the second D2D discovery period.

Example 89 is the wireless communication apparatus of Example 82, the logic to determine multiple frequency resource indices for the second D2D discovery period based the first time resource index, the first frequency resource index, the D2D discovery period index value corresponding to the second D2D discovery period, and a number of D2D discovery medium access control (MAC) protocol data units (PDUs) to be transmitted during the second D2D discovery period, and transmit the D2D MAC PDUs during the second D2D discovery period using frequency resources indicated by the multiple frequency resources indices.

Example 90 is the wireless communication apparatus of Example 82, the logic to determine the second time resource index and the second frequency resource index based on a parameter indicating a number of D2D discovery subframes comprised in the second D2D discovery period.

Example 91 is user equipment (UE), comprising an apparatus according to any of Examples 82 to 90, at least one radio frequency (RF) transceiver, and at least one RF antenna.

Example 92 is the UE of Example 91, comprising at least one memory unit, and a touchscreen display.

Example 93 is a wireless communication method, comprising receiving, at user equipment (UE), device-to-device (D2D) configuration information comprising a D2D discovery period index value for a first D2D discovery period and a first set of D2D discovery resource allocation parameters indicating a D2D discovery resource allocation for the first D2D discovery period, transmitting a first D2D discovery signal during the first D2D discovery period using the D2D discovery resource allocation for the first D2D discovery period, determining, by processing circuitry of the UE, a D2D discovery period index value for a second D2D discovery period based on the D2D discovery period index value for the first D2D discovery period, and determining a second set of D2D discovery resource allocation parameters based on the first set of D2D discovery resource allocation parameters and the D2D discovery period index value for the second D2D discovery period, the second set of D2D discovery resource allocation parameters to indicate a D2D discovery resource allocation for the second D2D discovery period.

Example 94 is the wireless communication method of Example 93, the first set of D2D discovery resource allocation parameters to comprise a first D2D discovery frequency resource index and a first D2D discovery time resource index, the second set of D2D discovery resource allocation parameters to comprise a second D2D discovery frequency resource index and a second D2D discovery time resource index.

Example 95 is the wireless communication method of Example 94, comprising determining the second D2D discovery frequency resource index based on the first D2D discovery frequency resource index, the first D2D discovery time resource index, and the D2D discovery period index value for the second D2D discovery period.

Example 96 is the wireless communication method of Example 94, comprising determining the second D2D discovery time resource index without reference to the D2D discovery period index value for the second D2D discovery period.

Example 97 is the wireless communication method of Example 94, comprising determining the second D2D discovery time resource index based on a cell-specific shift parameter comprised in the D2D configuration information.

Example 98 is the wireless communication method of Example 93, comprising determining the D2D discovery period index value for the second D2D discovery period based on the D2D discovery period index value for the first D2D discovery period and a maximum permissible D2D discovery period index value.

Example 99 is the wireless communication method of Example 98, comprising determining a value of 0 for the D2D discovery period index value for the second D2D discovery period in response to a determination that the D2D discovery period index value for the first D2D discovery period is equal to the maximum permissible D2D discovery period index value.

Example 100 is the wireless communication method of Example 93, comprising transmitting a second D2D discovery signal during the second D2D discovery period using the D2D discovery resource allocation for the second D2D discovery period.

Example 101 is at least one non-transitory computer-readable storage medium comprising a set of instructions that, in response to being executed on a computing device, cause the computing device to perform a wireless communication method according to any of Examples 93 to 100.

Example 102 is an apparatus, comprising means for performing a wireless communication method according to any of Examples 93 to 100.

Example 103 is a system, comprising the apparatus of Example 102, at least one radio frequency (RF) transceiver, and at least one RF antenna.

Example 104 is the system of Example 103, comprising at least one memory unit, and a touchscreen display.

Example 105 is a wireless communication apparatus, comprising means for transmitting one or more device-to-device (D2D) discovery signals during a first D2D discovery period using D2D discovery resources identified based on a first time resource index and a first frequency resource index, means for determining a second time resource index based on the first time resource index and the first frequency resource index, means for determining a second frequency resource index based on the first time resource index, the first frequency resource index, and a D2D discovery period index value corresponding to a second D2D discovery period, and means for identifying D2D discovery resources of the second D2D discovery period based on the second time resource index and the second frequency resource index.

Example 106 is the wireless communication apparatus of Example 105, comprising means for transmitting one or more D2D discovery signals during the second D2D discovery period using the identified D2D discovery resources of the second D2D discovery period.

Example 107 is the wireless communication apparatus of Example 105, comprising means for receiving a radio resource control (RRC) message comprising the first time resource index, the first frequency resource index, and a D2D discovery period index value corresponding to the first D2D discovery period.

Example 108 is the wireless communication apparatus of Example 107, comprising means for determining the D2D discovery period index value corresponding to the second D2D discovery period based on the D2D discovery period index value corresponding to the first D2D discovery period and a defined maximum D2D discovery period index value.

Example 109 is the wireless communication apparatus of Example 108, comprising means for determining the D2D discovery period index value corresponding to the second D2D discovery period by incrementing the D2D discovery period index value corresponding to the first D2D discovery period in response to a determination that the D2D discovery period index value corresponding to the first D2D discovery period is less than the defined maximum D2D discovery period index value, and means for determining the D2D discovery period index value corresponding to the second D2D discovery period to be equal to 0 in response to a determination that the D2D discovery period index value corresponding to the first D2D discovery period is equal to the defined maximum D2D discovery period index value.

Example 110 is the wireless communication apparatus of Example 107, comprising means for determining the second time resource index based on a cell-specific shift parameter comprised in the RRC message.

Example 111 is the wireless communication apparatus of Example 105, comprising means for determining the second time resource index without reference to the D2D discovery period index value corresponding to the second D2D discovery period.

Example 112 is the wireless communication apparatus of Example 105, comprising means for determining multiple frequency resource indices for the second D2D discovery period based the first time resource index, the first frequency resource index, the D2D discovery period index value corresponding to the second D2D discovery period, and a number of D2D discovery medium access control (MAC) protocol data units (PDUs) to be transmitted during the second D2D discovery period, and means for transmitting the D2D MAC PDUs during the second D2D discovery period using frequency resources indicated by the multiple frequency resources indices.

Example 113 is the wireless communication apparatus of Example 105, comprising means for determining the second time resource index and the second frequency resource index based on a parameter indicating a number of D2D discovery subframes comprised in the second D2D discovery period.

Example 114 is a system, comprising an apparatus according to any of Examples 105 to 113, at least one radio frequency (RF) transceiver, and at least one RF antenna.

Example 115 is the system of Example 114, comprising at least one memory unit, and a touchscreen display.

Example 116 is user equipment (UE), comprising at least one radio frequency (RF) transceiver to receive a radio resource control (RRC) message comprising device-to-device (D2D) discovery configuration information specifying a first time resource index and a first frequency resource index, and logic, at least a portion of which is in hardware, the logic to determine a first UE-specific resource allocation comprising a set of D2D discovery resources comprised in a D2D discovery resource pool for a first D2D discovery period, the first UE-specific resource allocation to be determined based on the first time resource index and the first frequency resource index, the at least one RF transceiver to transmit D2D discovery signals during the first D2D discovery period using the first UE-specific resource allocation, the logic to determine a second UE-specific resource allocation comprising a set of D2D discovery resources comprised in a D2D discovery resource pool for a second D2D discovery period, the second UE-specific resource allocation to be determined based on the first UE-specific resource allocation and a D2D discovery period index value for the second D2D discovery period.

Example 117 is the UE of Example 116, the at least one RF transceiver to transmit D2D discovery signals during the second D2D discovery period using the second UE-specific resource allocation.

Example 118 is the UE of Example 116, the logic to determine a set of D2D discovery resource allocation parameters for the second D2D discovery period based on the first time resource index, the first frequency resource index, and the D2D discovery period index value for the second D2D discovery period, the set of D2D discovery resource allocation parameters to comprise a second time resource index and a second frequency resource index, the logic to determine the second UE-specific resource allocation based on the set of D2D discovery resource allocation parameters.

Example 119 is the UE of Example 118, the logic to determine the second frequency resource index based on the first time resource index, the first frequency resource index, and the D2D discovery period index value for the second D2D discovery period.

Example 120 is the UE of Example 118, the logic to determine the second time resource index without reference to the D2D discovery period index value for the second D2D discovery period.

Example 121 is the UE of Example 118, the logic to determine the second time resource index based on a cell-specific shift parameter comprised in the D2D discovery configuration information.

Example 122 is the UE of Example 116, the logic to determine the D2D discovery period index value for the second D2D discovery period based on a D2D discovery period index value for the first D2D discovery period, the D2D discovery period index value for the first D2D discovery period to be comprised in the D2D discovery configuration information.

Example 123 is the UE of Example 122, the logic to determine the D2D discovery period index value for the second D2D discovery period based on the D2D discovery period index value for the first D2D discovery period and a defined maximum D2D discovery period index value.

Example 124 is the UE of any of Examples 116 to 123, comprising at least one memory unit, and a touchscreen display.

Example 125 is user equipment (UE), comprising at least one radio frequency (RF) transceiver to transmit one or more device-to-device (D2D) discovery signals during a first D2D discovery period using D2D discovery resources identified based on a first time resource index and a first frequency resource index, and logic, at least a portion of which is in hardware, the logic to determine a second time resource index based on the first time resource index and the first frequency resource index, determine a second frequency resource index based on the first time resource index, the first frequency resource index, and a D2D discovery period index value corresponding to a second D2D discovery period, and identify D2D discovery resources of the second D2D discovery period based on the second time resource index and the second frequency resource index.

Example 126 is the UE of Example 125, the at least one RF transceiver to transmit one or more D2D discovery signals during the second D2D discovery period using the identified D2D discovery resources of the second D2D discovery period.

Example 127 is the UE of Example 125, the at least one RF transceiver to receive a radio resource control (RRC) message comprising the first time resource index, the first frequency resource index, and a D2D discovery period index value corresponding to the first D2D discovery period.

Example 128 is the UE of Example 127, the logic to determine the D2D discovery period index value corresponding to the second D2D discovery period based on the D2D discovery period index value corresponding to the first D2D discovery period and a defined maximum D2D discovery period index value.

Example 129 is the UE of Example 128, the logic to determine the D2D discovery period index value corresponding to the second D2D discovery period by incrementing the D2D discovery period index value corresponding to the first D2D discovery period in response to a determination that the D2D discovery period index value corresponding to the first D2D discovery period is less than the defined maximum D2D discovery period index value, and determine the D2D discovery period index value corresponding to the second D2D discovery period to be equal to 0 in response to a determination that the D2D discovery period index value corresponding to the first D2D discovery period is equal to the defined maximum D2D discovery period index value.

Example 130 is the UE of Example 127, the logic to determine the second time resource index based on a cell-specific shift parameter comprised in the RRC message.

Example 131 is the UE of Example 125, the logic to determine the second time resource index without reference to the D2D discovery period index value corresponding to the second D2D discovery period.

Example 132 is the UE of Example 125, the logic to determine multiple frequency resource indices for the second D2D discovery period based the first time resource index, the first frequency resource index, the D2D discovery period index value corresponding to the second D2D discovery period, and a number of D2D discovery medium access control (MAC) protocol data units (PDUs) to be transmitted during the second D2D discovery period, the at least one RF transceiver to transmit the D2D MAC PDUs during the second D2D discovery period using frequency resources indicated by the multiple frequency resources indices.

Example 133 is the UE of Example 125, the logic to determine the second time resource index and the second frequency resource index based on a parameter indicating a number of D2D discovery subframes comprised in the second D2D discovery period.

Example 134 is the UE of any of Examples 125 to 133, comprising at least one memory unit, and a touchscreen display.

Example 135 is a wireless communication apparatus, comprising means for receiving a radio resource control (RRC) message comprising device-to-device (D2D) discovery configuration information specifying a first time resource index and a first frequency resource index, means for determining a first user equipment (UE)-specific resource allocation comprising a set of D2D discovery resources comprised in a D2D discovery resource pool for a first D2D discovery period, the first UE-specific resource allocation to be determined based on the first time resource index and the first frequency resource index, means for transmitting D2D discovery signals during the first D2D discovery period using the first UE-specific resource allocation, and means for determining a second UE-specific resource allocation comprising a set of D2D discovery resources comprised in a D2D discovery resource pool for a second D2D discovery period, the second UE-specific resource allocation to be determined based on the first UE-specific resource allocation and a D2D discovery period index value for the second D2D discovery period.

Example 136 is the wireless communication apparatus of Example 135, comprising means for transmitting D2D discovery signals during the second D2D discovery period using the second UE-specific resource allocation.

Example 137 is the wireless communication apparatus of Example 135, comprising means for determining a set of D2D discovery resource allocation parameters for the second D2D discovery period based on the first time resource index, the first frequency resource index, and the D2D discovery period index value for the second D2D discovery period, the set of D2D discovery resource allocation parameters to comprise a second time resource index and a second frequency resource index, and means for determining the second UE-specific resource allocation based on the set of D2D discovery resource allocation parameters.

Example 138 is the wireless communication apparatus of Example 137, comprising means for determining the second frequency resource index based on the first time resource index, the first frequency resource index, and the D2D discovery period index value for the second D2D discovery period.

Example 139 is the wireless communication apparatus of Example 137, comprising means for determining the second time resource index without reference to the D2D discovery period index value for the second D2D discovery period.

Example 140 is the wireless communication apparatus of Example 137, comprising means for determining the second time resource index based on a cell-specific shift parameter comprised in the D2D discovery configuration information.

Example 141 is the wireless communication apparatus of Example 135, comprising means for determining the D2D discovery period index value for the second D2D discovery period based on a D2D discovery period index value for the first D2D discovery period, the D2D discovery period index value for the first D2D discovery period to be comprised in the D2D discovery configuration information.

Example 142 is the wireless communication apparatus of Example 141, comprising means for determining the D2D discovery period index value for the second D2D discovery period based on the D2D discovery period index value for the first D2D discovery period and a defined maximum D2D discovery period index value.

Example 143 is a system, comprising an apparatus according to any of Examples 135 to 142, at least one radio frequency (RF) transceiver, and at least one RF antenna.

Example 144 is the system of Example 143, comprising at least one memory unit, and a touchscreen display.

Example 145 is at least one non-transitory computer-readable storage medium comprising a set of wireless communication instructions that, in response to being executed at user equipment (UE), cause the UE to receive device-to-device (D2D) configuration information comprising a D2D discovery period index value for a first D2D discovery period and a first set of D2D discovery resource allocation parameters indicating a D2D discovery resource allocation for the first D2D discovery period, transmit a first D2D discovery signal during the first D2D discovery period using the D2D discovery resource allocation for the first D2D discovery period, determine a D2D discovery period index value for a second D2D discovery period based on the D2D discovery period index value for the first D2D discovery period, and determine a second set of D2D discovery resource allocation parameters based on the first set of D2D discovery resource allocation parameters and the D2D discovery period index value for the second D2D discovery period, the second set of D2D discovery resource allocation parameters to indicate a D2D discovery resource allocation for the second D2D discovery period.

Example 146 is the at least one non-transitory computer-readable storage medium of Example 145, the first set of D2D discovery resource allocation parameters to comprise a first D2D discovery frequency resource index and a first D2D discovery time resource index, the second set of D2D discovery resource allocation parameters to comprise a second D2D discovery frequency resource index and a second D2D discovery time resource index.

Example 147 is the at least one non-transitory computer-readable storage medium of Example 146, comprising wireless communication instructions that, in response to being executed at the UE, cause the UE to determine the second D2D discovery frequency resource index based on the first D2D discovery frequency resource index, the first D2D discovery time resource index, and the D2D discovery period index value for the second D2D discovery period.

Example 148 is the at least one non-transitory computer-readable storage medium of Example 146, comprising wireless communication instructions that, in response to being executed at the UE, cause the UE to determine the second D2D discovery time resource index without reference to the D2D discovery period index value for the second D2D discovery period.

Example 149 is the at least one non-transitory computer-readable storage medium of Example 146, comprising wireless communication instructions that, in response to being executed at the UE, cause the UE to determine the second D2D discovery time resource index based on a cell-specific shift parameter comprised in the D2D configuration information.

Example 150 is the at least one non-transitory computer-readable storage medium of Example 145, comprising wireless communication instructions that, in response to being executed at the UE, cause the UE to determine the D2D discovery period index value for the second D2D discovery period based on the D2D discovery period index value for the first D2D discovery period and a maximum permissible D2D discovery period index value.

Example 151 is the at least one non-transitory computer-readable storage medium of Example 150, comprising wireless communication instructions that, in response to being executed at the UE, cause the UE to determine a value of 0 for the D2D discovery period index value for the second D2D discovery period in response to a determination that the D2D discovery period index value for the first D2D discovery period is equal to the maximum permissible D2D discovery period index value.

Example 152 is the at least one non-transitory computer-readable storage medium of Example 145, comprising wireless communication instructions that, in response to being executed at the UE, cause the UE to transmit a second D2D discovery signal during the second D2D discovery period using the D2D discovery resource allocation for the second D2D discovery period.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. User equipment (UE), comprising:
at least one radio frequency (RF) transceiver to receive device-to-device (D2D) configuration information comprising a D2D discovery period index value for a first D2D discovery period and a first set of D2D discovery resource allocation parameters indicating a D2D discovery resource allocation for the first D2D discovery period and transmit a first D2D discovery signal during the first D2D discovery period using the D2D discovery resource allocation for the first D2D discovery period; and
circuitry to determine a D2D discovery period index value for a second D2D discovery period based on the D2D discovery period index value for the first D2D discovery period and determine a second set of D2D discovery resource allocation parameters based on the first set of D2D discovery resource allocation parameters and the D2D discovery period index value for the second D2D discovery period, the second set of D2D discovery resource allocation parameters to indicate a D2D discovery resource allocation for the second D2D discovery period, the first set of D2D discovery resource allocation parameters to comprise a first D2D discovery frequency resource index and a first D2D discovery time resource index, the second set of D2D discovery resource allocation parameters to comprise a second D2D discovery frequency resource index and a second D2D discovery time resource index.

2. The UE of claim 1, the circuitry to determine the second D2D discovery frequency resource index based on the first D2D discovery frequency resource index, the first D2D discovery time resource index, and the D2D discovery period index value for the second D2D discovery period.

3. The UE of claim 1, the circuitry to determine the second D2D discovery time resource index without reference to the D2D discovery period index value for the second D2D discovery period.

4. The UE of claim 1, the circuitry to determine the second D2D discovery time resource index based on a cell-specific shift parameter comprised in the D2D configuration information.

5. The UE of claim 1, the circuitry to determine the D2D discovery period index value for the second D2D discovery period based on the D2D discovery period index value for the first D2D discovery period and a maximum permissible D2D discovery period index value.

6. The UE of claim 5, the circuitry to determine a value of 0 for the D2D discovery period index value for the second D2D discovery period in response to a determination that the D2D discovery period index value for the first D2D discovery period is equal to the maximum permissible D2D discovery period index value.

7. The UE of claim 1, the at least one RF transceiver to transmit a second D2D discovery signal during the second D2D discovery period using the D2D discovery resource allocation for the second D2D discovery period.

8. The UE of claim 1, comprising:
at least one memory unit; and
a touchscreen display.

9. At least one non-transitory computer-readable storage medium comprising a set of instructions that, in response to being executed at user equipment (UE), cause the UE to:
transmit one or more device-to-device (D2D) discovery signals during a first D2D discovery period using D2D discovery resources identified based on a first time resource index and a first frequency resource index;
determine a second time resource index based on the first time resource index and the first frequency resource index;
determine a second frequency resource index based on the first time resource index, the first frequency resource index, and a D2D discovery period index value corresponding to a second D2D discovery period; and
identify D2D discovery resources of the second D2D discovery period based on the second time resource index and the second frequency resource index.

10. The at least one non-transitory computer-readable storage medium of claim 9, comprising instructions that, in response to being executed at the UE, cause the UE to transmit one or more D2D discovery signals during the second D2D discovery period using the identified D2D discovery resources of the second D2D discovery period.

11. The at least one non-transitory computer-readable storage medium of claim 9, comprising instructions that, in response to being executed at the UE, cause the UE to receive a radio resource control (RRC) message comprising the first time resource index, the first frequency resource index, and a D2D discovery period index value corresponding to the first D2D discovery period.

12. The at least one non-transitory computer-readable storage medium of claim 11, comprising instructions that, in response to being executed at the UE, cause the UE to determine the D2D discovery period index value corresponding to the second D2D discovery period based on the D2D discovery period index value corresponding to the first D2D discovery period and a defined maximum D2D discovery period index value.

13. The at least one non-transitory computer-readable storage medium of claim 12, comprising instructions that, in response to being executed at the UE, cause the UE to
determine the D2D discovery period index value corresponding to the second D2D discovery period by incrementing the D2D discovery period index value corresponding to the first D2D discovery period in response to a determination that the D2D discovery period index value corresponding to the first D2D discovery period is less than the defined maximum D2D discovery period index value; and
determine the D2D discovery period index value corresponding to the second D2D discovery period to be equal to 0 in response to a determination that the D2D discovery period index value corresponding to the first D2D discovery period is equal to the defined maximum D2D discovery period index value.

14. The at least one non-transitory computer-readable storage medium of claim 11, comprising instructions that, in response to being executed at the UE, cause the UE to determine the second time resource index based on a cell-specific shift parameter comprised in the RRC message.

15. The at least one non-transitory computer-readable storage medium of claim 9, comprising instructions that, in response to being executed at the UE, cause the UE to determine the second time resource index without reference to the D2D discovery period index value corresponding to the second D2D discovery period.

16. The at least one non-transitory computer-readable storage medium of claim 9, comprising instructions that, in response to being executed at the UE, cause the UE to:
determine multiple frequency resource indices for the second D2D discovery period based the first time resource index, the first frequency resource index, the D2D discovery period index value corresponding to the second D2D discovery period, and a number of D2D discovery medium access control (MAC) protocol data units (PDUs) to be transmitted during the second D2D discovery period; and
transmit the D2D MAC PDUs during the second D2D discovery period using frequency resources indicated by the multiple frequency resources indices.

17. The at least one non-transitory computer-readable storage medium of claim 9, comprising instructions that, in response to being executed at the UE, cause the UE to determine the second time resource index and the second frequency resource index based on a parameter indicating a number of D2D discovery subframes comprised in the second D2D discovery period.

18. An apparatus, comprising:
circuitry to receive a radio resource control (RRC) message comprising device-to-device (D2D) discovery configuration information specifying a first time resource index and a first frequency resource index, determine a first user equipment (UE)-specific resource allocation comprising a set of D2D discovery resources comprised in a D2D discovery resource pool for a first D2D discovery period, the first UE-specific resource allocation to be determined based on the first time resource index and the first frequency resource index, the logic to transmit D2D discovery signals during the first D2D discovery period using the first UE-specific resource allocation and determine a second UE-specific resource allocation comprising a set of D2D discovery resources comprised in a D2D discovery resource pool for a second D2D discovery period, the second UE-specific resource allocation to be determined based on the first UE-specific resource allocation and a D2D discovery period index value for the second D2D discovery period.

19. The apparatus of claim 18, the circuitry to transmit D2D discovery signals during the second D2D discovery period using the second UE-specific resource allocation.

20. The apparatus of claim 18, the circuitry to determine a set of D2D discovery resource allocation parameters for the second D2D discovery period based on the first time resource index, the first frequency resource index, and the D2D discovery period index value for the second D2D discovery period, the set of D2D discovery resource allocation parameters to comprise a second time resource index and a second frequency resource index, the logic to determine the second UE-specific resource allocation based on the set of D2D discovery resource allocation parameters.

21. The apparatus of claim 20, the circuitry to determine the second frequency resource index based on the first time resource index, the first frequency resource index, and the D2D discovery period index value for the second D2D discovery period.

22. The apparatus of claim 20, the circuitry to determine the second time resource index without reference to the D2D discovery period index value for the second D2D discovery period.

23. The apparatus of claim 20, the circuitry to determine the second time resource index based on a cell-specific shift parameter comprised in the D2D discovery configuration information.

24. The apparatus of claim 20, the circuitry to determine the D2D discovery period index value for the second D2D discovery period based on a D2D discovery period index value for the first D2D discovery period, the D2D discovery period index value for the first D2D discovery period to be comprised in the D2D discovery configuration information.

25. The apparatus of claim 24, the circuitry to determine the D2D discovery period index value for the second D2D discovery period based on the D2D discovery period index value for the first D2D discovery period and a defined maximum D2D discovery period index value.

26. User equipment (UE), comprising:
the apparatus of claim 18;
at least one radio frequency (RF) transceiver; and
at least one RF antenna.

* * * * *